US00RE46967E

(19) United States
(12) Reissued Patent
Snyder

(10) Patent Number: US RE46,967 E
(45) Date of Reissued Patent: Jul. 24, 2018

(54) SYSTEM, APPARATUS, METHOD, AND COMPUTER PROGRAM PRODUCT FOR INDEXING A FILE

(75) Inventor: Russell Snyder, Mt. Laurel, NJ (US)

(73) Assignee: Mineral Lassen LLC, Las Vegas, NV (US)

(21) Appl. No.: 11/513,423

(22) Filed: Aug. 31, 2006

Related U.S. Patent Documents

Reissue of:

(64) Patent No.: 6,643,641
Issued: Nov. 4, 2003
Appl. No.: 09/559,501
Filed: Apr. 27, 2000

U.S. Applications:

(63) Continuation of application No. 11/266,750, filed on Nov. 4, 2005, now Pat. No. Re. 42,413, which is an application for the reissue of Pat. No. 6,643,641.

(51) Int. Cl.
*G06F 17/30* (2006.01)

(52) U.S. Cl.
CPC .. *G06F 17/30864* (2013.01); *G06F 17/30463* (2013.01); *G06F 17/30867* (2013.01); *Y10S 707/915* (2013.01); *Y10S 707/959* (2013.01); *Y10S 707/99934* (2013.01); *Y10S 707/99943* (2013.01); *Y10S 707/99945* (2013.01)

(58) Field of Classification Search
USPC ..... 707/3, 4, 10, 704, 713, 769; 715/234, 715/763, 781
See application file for complete search history.

(56) References Cited

U.S. PATENT DOCUMENTS 5,297,249 A * 3/1994 Bernstein et al. ..... 715/501.1
5,367,623 A * 11/1994 Iwai et al. ..... 345/776
5,572,643 A * 11/1996 Judson ..... 709/218
5,737,599 A * 4/1998 Rowe et al. ..... 707/10
5,737,619 A * 4/1998 Judson ..... 715/236
5,761,655 A * 6/1998 Hoffman ..... 707/4
5,790,114 A * 8/1998 Geaghan et al. ..... 715/763
5,848,409 A * 12/1998 Ahn ..... 707/3
(Continued)

FOREIGN PATENT DOCUMENTS

EP 863638 9/1998
JP 09138803 5/1997
(Continued)

OTHER PUBLICATIONS

Terveen et al., "Constructing, Organizing, and Visualizing Collections of Topically Related Web Resources," ACM Transactions on Computer-Human Interaction, vol. 6, No. 1, Mar. 1999.
(Continued)

*Primary Examiner* — Luke S. Wassum

(57) ABSTRACT

A search engine manages the indexing of web page contents and accepts user selection criteria to find and report hits that meet the search criteria. The inventive search engine has an associated crawler function wherein display images of the web pages are rendered and stored as snapshots, preferably when the pages are indexed. The search engine reports search results by composing an html page with links to the corresponding page hits and containing snapshot reduced size graphic images showing the web pages as they appeared when fetched and stored as snapshots.

20 Claims, 3 Drawing Sheets

(56) References Cited

U.S. PATENT DOCUMENTS 5,864,863 A 1/1999 Burrows
5,920,856 A * 7/1999 Syeda-Mahmood ..... 707/3
5,982,369 A 11/1999 Sciammarella et al.
5,983,218 A * 11/1999 Syeda-Mahmood ..... 707/3
6,011,537 A 1/2000 Slotznick
6,014,668 A * 1/2000 Tabata et al. ..... 707/10
6,064,755 A * 5/2000 Some ..... 382/132
6,070,176 A 5/2000 Downs et al.
6,154,738 A * 11/2000 Call ..... 705/20
6,157,935 A * 12/2000 Tran et al. ..... 715/202
6,182,072 B1 1/2001 Leak et al.
6,182,090 B1 1/2001 Peairs
6,237,011 B1 * 5/2001 Ferguson et al. ..... 715/234
6,271,840 B1 8/2001 Finseth et al.
6,313,855 B1 11/2001 Shuping et al.
6,335,742 B1 * 1/2002 Takemoto ..... 715/781
6,351,467 B1 * 2/2002 Dillon ..... G06F 17/30017 370/432
6,356,908 B1 3/2002 Brown et al.
6,374,260 B1 4/2002 Hoffert et al.
6,389,417 B1 5/2002 Shin et al.
6,415,282 B1 7/2002 Mukherjea et al.
6,456,334 B1 * 9/2002 Duhault ..... H04N 5/45 348/564
6,523,063 B1 * 2/2003 Miller et al. ..... 709/206
6,665,838 B1 12/2003 Brown et al.
6,678,673 B1 1/2004 Eves et al.
6,708,172 B1 3/2004 Wong et al.
6,711,567 B2 3/2004 Littlefield et al.
6,725,214 B2 4/2004 Garcia-Chiesa
6,725,221 B2 4/2004 Murakami et al.
6,829,619 B1 * 12/2004 Wakamatsu ..... G06F 17/3025 709/203
6,845,214 B1 * 1/2005 Funaya ..... H04N 21/23614 375/E7.134
6,904,227 B1 * 6/2005 Yamamoto ..... G11B 27/034 386/241
6,934,964 B1 * 8/2005 Schaffer ..... H04N 7/163 348/E7.061
6,964,018 B1 11/2005 Masui
7,000,242 B1 * 2/2006 Haber ..... G06F 17/30274 715/719
7,039,860 B1 * 5/2006 Gautestad ..... 715/205
7,047,180 B1 5/2006 Mathews et al.
7,051,019 B1 5/2006 Land et al.
8,464,302 B1 * 6/2013 Liwerant ..... H04N 21/2181 725/105
2001/0011365 A1 8/2001 Helfman
2002/0038299 A1 3/2002 Zernik et al.
2002/0166122 A1 * 11/2002 Kikinis ..... H04N 5/44543 725/56
2005/0010860 A1 1/2005 Weiss et al.
2005/0047681 A1 * 3/2005 Hori ..... G06F 17/30817 382/305
2005/0257400 A1 * 11/2005 Sommerer ..... G06F 17/30873 36/13
2006/0184886 A1 8/2006 Chung et al.
2008/0148330 A1 * 6/2008 Liwerant ..... H04N 7/17318 725/109

FOREIGN PATENT DOCUMENTS

JP 10207898 8/1998
JP 11110323 4/1999
JP 11149469 6/1999
JP 11250104 9/1999
WO 1997/04409 2/1997
WO WO 2010/124721 A1 * 11/2010 ..... H04W 72/04

OTHER PUBLICATIONS

Borek, "A Hypertext Markup Language Interface for Multi-Product Database Libraries," Information Technology Conference, IEEE, 1998.
Mukheriea et al., "Amore: A World-Wide Web Image Retrieval Engine," ACM, May 1999.
Frankel et al., "WebSeer: An Image Search Engine for the World Wide Web," Aug. 1, 1996.
Taycher et al., Image Digestion and Relevance Feedback in the ImageRover WWW Search Engine, Visual 1997.
Cox et al., "Visual Dialog Showing Speech Interaction with an Intelligent Agent," IBM TDB, Jan. 1996.
Li et al., "Multimedia Content Description in the Infopyramid," IEEE, 19998.
Bellamy et al., "Dynamic Visual Metaphors for News Story Abstractions," System Science, 1999.
Ma et al., "A Generalized Content-Based Image Retrieval System," ACM 1998.
Image and Video Searching (www.ditto.com, www.broadcast.com_ (Company Business and Marketing) Home Office Computing, 17, 11, 20 (Nov. 1999) Gale Group Magazine DB (TM).
So, Siu-Kai et al., "Allocating Data Objects to Multiple Sites for Fast Browsing of Hypermedia Documents", Proceedings of the 22nd Annual International Computer Software and Applications Conference, Aug. 19-21, 1998, pp. 406-411.

* cited by examiner

SYSTEM, APPARATUS, METHOD, AND COMPUTER PROGRAM PRODUCT FOR INDEXING A FILE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for the reissue of U.S. Pat. No. 6,643,641. The reissue applications are U.S. patent application Ser. No. 11/266,750, filed Nov. 4, 2005 (the parent reissue application) and U.S. patent application Ser. No. 11/513,423 filed Aug. 31, 2006 (the present continuation reissue application of the parent reissue application), all of which are reissues of U.S. Pat. No. 6,643,641.*

BACKGROUND OF THE INVENTION

1. Field of the Invention

The invention concerns methods and apparatus for representing data file contents for searching the data files and reporting selected data file addresses, especially hypertext markup language files accessed using an Internet search engine (i.e., Web pages). One process develops a database representing the text content of data files on a network. Another process renders graphic representations of the files according to a default configuration and stores a compressed graphic file for each. A further process selects file hits according to user criteria and reports their addresses with associated presentation of the stored graphic file.

2. Prior Art

A search engine is a useful facility for browsing the Internet or World Wide Web. Popular browsers such as Microsoft Internet Explorer and Netscape Navigator display visual outputs using hypertext markup language or "html." An enormous variety of information is stored in html format in subscriber homepages and the like on the Web, and much of the information is accessible on the Web by simply pointing one's browser to the associated page or file. Html files typically contain, for example, text and numeric information, typographical symbols, information defining formatting particulars by which the text is to appear on a display of the file, and uniform resource location references (URLs), which are hypertext links that address other files. Some of the URLs address or point to other hypertext pages that are linked to a displayed page. The user can highlight and select a URL by pointing and clicking using his/her mouse, whereupon the browser loads and displays the identified page. Alternatively, the link may be such that this point-and-click method causes the browser to jump to a display of a different position in the file, or to perform an identified action such as downloading and playing an audio or video file, or may cause the browser to alter its display of the present data, such as inserting or enlarging a display of a graphic file. The link may also cause the browser to invoke an applications program or a process, etc.

The html files which are addressed typically contain certain formatting information. All users who download the html file obtain the identical file and formatting. However, the display and processing of the files is not necessarily the same from one user's browser to another. The html page does not contain a fixed graphic data display. The html page contains text, addresses and encoding information which are processed by the browser and the system operating the browser, to prepare and present a graphic data display.

Browsers from different software suppliers are not identical and operate somewhat differently. The same browser program can be set up by user options for display of data in selected ways, including for example choices of font size and font type. There are also alternative choices for applications programs that may be run within the browser (often called plug-ins) or which are invoked when a file of a particular type is selected.

Using font size as an example, the operating system (e.g., Microsoft Windows) and the display may be configured to employ a certain X-Y pixel size and color display resolution. In the browser, the user may have selected one of several available font sizes, which in combination with the X-Y pixel size of the display field determines the vertical and horizontal size of each character. These choices affect pagination and the layout of text within text subdivisions such as paragraphs or tables. The browser may allow the user to select a default character alphabet. The browser may also allow the user to select how and whether background and foreground colors are displayed, or whether colors are even used in certain situations, such as to distinguish links from other text or to highlight a link when selected by the cursor or mouse.

The typical html source file contains text and may include or contain addresses identifying static or dynamic files and information, but the source files are usually not limited to text. The source files contain header, footer, paragraph and section markers, font and color changes which may distinguish sections, markers indicating text strings to be interpreted as html links (URL addresses that are delineated as such), and other formatting and instructions. These and other markers, which include hidden text tags and textual start/stop markers, are not themselves displayed but instead are used to carry undisplayed information or as specifications for display of the remaining text according to preset rules and configuration choices in the browser and the operating system.

Users often refer to the display of a particular web page as "going to" the web page. In fact, "going to" the web page is a misnomer. The process actually involves sending a message to a remote server or user station on the web that requests transmission of the html source code stored there. Upon receipt the source code is processed locally by the browser so as to produce data representing a graphic display. The graphic display data is stored in a memory buffer in the system RAM or in an associated display driver card from which the luminance, saturation and hue of each pixel in the display are determined. After "going to" a web page, the browser may store a copy of the source code locally so that using the "Back" function reloads the page without the need to wait for another exchange of messages over the Web.

Users may know the URL for a web site they wish to load, but also may need to find files with selected content without knowing the corresponding URL. For this purpose the user can "search the Web" using a search engine. Early search engines did live web page searches and came to be known as "web crawlers." The number of searchable pages has multiplied, however, and it would be an immensely large job to attempt to address, load and search all the possible URLs that might identify a web page today. This web crawling method is now impractical for on-demand searching.

Search engines now operating do not search web pages on demand. Instead the search engine operators use various means to build a limited database reflecting the contents of a number of web pages. The users' search criteria are applied to the database to identify the addresses of web pages that meet the search criteria, at least from a subset of all existing web pages. Web page content can be changed. The search is current up to the most recent time at which the search engine database was updated to reflect the latest content of the web pages subject to search.

The web pages to be reflected in the database are indexed to build a record of the terms that appear in each web page. Search engines vary but typically the index database reflects at least the presence of single words to enable selection by Boolean combinations. At least some proximity relationships and/or the presence of exact phrases can be made searchable. The indexing can include a selection of field information, such as revision dates, country of domain and other fields, which in some cases are automatically generated and in others require human review (e.g., to define a business category).

The search engine operator can use various methods to find or select web page addresses that will be loaded and analyzed or indexed in building the database. The methods may be chosen to expand or to limit the number of web pages that the search engine will access. As a result, the results of searches vary among the different search engines.

For example a web crawler or similar routine might attempt to load and analyze pages corresponding to all the top level domain names that are found to be registered with public domain name services or listed in a directory service [e.g., http://www.[domain].com]. Search engine services also can queue for indexing all pages that they are specifically requested to index (which request might be submitted by the page owner or another).

When indexing an initial collection of web pages, the list can be expanded by parsing the received pages for hypertext links and URL addresses that identify additional pages, and then loading and analyzing all the pages that are connected to the initial pages in that way. This process can be extended indefinitely. A smaller set of pages might be obtained by only indexing the top level pages or only links to top level pages out to a certain number of links from the originally targeted page.

Examples of search engines include Hotbot, Alta Vista, Yahoo, NorthernLight, Excite, etc. In addition, there are some search engine portals that run the same user query through a plurality of other search engines. The search engine comprises a processor that maintains a web page which the user loads by aiming his browser at the search engine URL (e.g., Excite's URL is http://www.excite.com/). The received page (namely the processed version of the html source code that is displayed) typically includes one or more Common Gateway Interface (CGI) boxes or similar form processing means by which a user who wishes to make a search enters one or more letter strings as search criteria. Boolean combinations of two or more strings often can be included or will be implied if not stated. The criteria typically are construed met if the specified words or phrases are found anywhere in the html source code of the target pages when last indexed. This includes portions that are not displayed (e.g., meta-tags and comments). The criteria can specify attributes other than the presence anywhere of a certain text string. This may be helpful, for example, to limit search results to finding files of a certain type (e.g., with URLs linking to a certain file extension type to find a certain kind of media). The criteria can also bracket out files in a selected date window.

The search engine compares the criteria to available information for web pages and sends to the user a report identifying the web pages that meet the criteria. The report to the user is transmitted in html source code. To generate the report, the search engine finds URLs for the selected web pages and inserts a list of these URLs into a shell form (i.e., an "empty" html source code file). The shell form has text and formatting to display title headers, possibly also ad banners and similar information. The URL list that is produced is inserted into the html shell. Each URL is flagged in the html source as identifying an html link (href=[etc.]). Thus when the list is displayed by the users browser, the user can select among the results and point and click or similarly highlight and invoke the html link addressing the page that the search engine considered to meet the user's criteria. This then loads the html source code directly from the remote page that was selected and the browser displays the current contents of the referenced web page according the html source code found there at that time.

After running a search and loading the web page referenced in a URL that is mentioned by the search engine as meeting the search criteria, it is not unusual that the user may not find the loaded web page to contain the terms used as the search criteria. This occurs because the content of the page was changed to eliminate the search term between the time that it was indexed by the search engine and loaded by the user who ran the search. For the same reasons, linked pages that are reported by a search engine sometimes no longer exist.

It would be possible to employ a web crawler process not only to find and index web pages but also to update the pages already indexed. The job of indexing web pages is growing constantly, and the job of also revising indexing work that already has been completed is that much larger of a job. The operator of the search engine must make some decisions on allocating available resources of memory, processing power and communication bandwidth to the jobs of seeking out web pages, indexing and storing usefully complete database information on the pages, and updating their database, as well as to handle user search requests and reports.

The typical search engine reports more to the search than the URLs of the indexed pages that meet the searcher's selection criteria. The URLs themselves, which are formatted as hypertext links in the search report, sometimes provide information as to whether or not a search hit is pertinent to the user's desires. For example the domain name associated with the page may identify an owner known to be in a pertinent business, or on the contrary may show that the search result is plainly not relevant to the search. The search engine typically also stores and includes in the search report listing one or two of the first lines of the web page that is referenced, which frequently includes a title that may be helpful to show quickly whether the selected page is of interest. The search listing also may show the date at which the web page was last updated or the date that it was indexed.

The usual success rate in finding a pertinent page or website in one try or only a few tries is actually rather low. The success rate varies with the subject matter, but in a typical search the user's search criteria may turn out to be unduly broad and may select so many pages that they cannot all be reviewed, or may be so narrow that much desired content is excluded, either of which can be an unsatisfactory and perhaps frustrating experience. Balancing the needs to include relevant material and to exclude irrelevant material can result in a substantial expenditure of time, much of which is effectively wasted.

It would be advantageous if the presentation of search results could be supplemented to more effectively assist a user running a search to quickly and meaningfully separate the pertinent and irrelevant results. However, such a capability will only be useful if it can be accomplished without unduly adding processing time and storage requirements to the steps involved in preparing database information for search and in presenting the results to the user.

SUMMARY OF THE INVENTION

It is an object of the invention to provide an abbreviated representation of searchable data files, in particular Internet/Intranet/Extranet html data pages, which represents their text and linked graphics in a visual snapshot form to supplement representations such as introductory text passages and URL addresses. It is a further object to collect and process the necessary information before conducting searches and to store a relatively small graphic file in association with the search database for representing each potential hit. The respective graphics file is reported to the user when a search results in a hit on the file, namely by inserting a hyperlink to the stored file in the search report sent to the user as the search results.

It is another object of the invention to overcome problems associated with the fact that different user configurations result in differences in the manner of displaying files, by preparing a graphic snapshot presentation as described, according to a default set of configuration parameters. Such parameters can specify font type and sizes, colors, backgrounds, screen pixel resolution and the like.

It is a further object to generate and store such an abbreviated visual presentation or shapshot as part of the process of building one or more databases using a web crawler or automated information review process to find and load or otherwise accept and process html pages. Preferably previously processed pages are again accessed and the database is periodically updated. Optionally, the abbreviated snapshot representation can be provided in combination with or in lieu of a tabular listing of the associated hypertext link and perhaps also an introductory portion of the text of the html pages. A hypertext link can be associated with the graphic snapshot such that the user (searcher) can point and click on the graphic to load and view the associated web page.

It is another object to permit such snapshot representation to be initially processed, or reloaded, processed and updated at times or at a frequency that is different from that at which the web crawler database is updated with respect to the text content of the web pages.

These and other objects are accomplished by the improved search engine of the invention, for managing user search and selection of data files stored at distributed systems coupled at network addresses. In particular the search engine is effective to improve searching of hypertext web pages on the Internet. The search engine has an associated web crawler operable to address and load successive web pages, and to index text data associated with the successive web pages. In this manner the search engine obtains parameter information such as words appearing in documents, word proximity and other information that can be used to distinguish at least groups of the web pages from one another when conducting a search. The web crawler stores the parameter information in a manner that cross references the paramater information with the associated web addresses or URLs of the web pages. The search engine accepts user-submitted search criteria and conducts a search or the parameter information to select the associated addresses of web pages that met all or part of the search criteria. The results can potentially be ranked, subdivided into categories and similarly handled according to known search engine operation. According to an inventive aspect, in conjunction with obtaining the parameter information for at least a subset of the web pages subject to search, the crawler renders a display image of the web page that is being indexed, and processes the image to provide a reduced size graphic image file corresponding to a static visual presentation of each of the indexed web pages. This graphic image file preferably is stored in a compressed graphic file format such as GIF, JPG, or a similar file, the file address or URL of which is stored and cross referenced to the criteria in the database that identifies the corresponding web page. When a search is conducted and results in a hit on a web page, its graphic snapshot is linked to the search results reported to the user. In a preferred embodiment, acceptance of the user search criteria and reporting of the results are handled by html page exchange communications between the search engine and the user. The search engine is accessed by the user and provides a form page having CGI boxes or the like for accepting text and/or other selections from the user. The search engine conducts a search which identifies one or more hits that are reported to the user by sending an html search results page. The search results page is composed by the search engine as a function of the search results and may contain no hits or a number of hits. Each of the hits is identified in the search results by the graphic snapshot, and preferably also by text information that reflects the content of the web page hit. Preferably, the search results page is composed to include a hypertext link to the URL address where the graphic snapshot file has been stored by the web-crawler/database/search-engine processes, for example by an IMG SRC=[path\filename] command inserted in html source code. As a result, the image file is loaded by the user's browser when processing the search results page, which generally occurs after the display of text has been accomplished.

As a result, the search results appearing on the user's browser include links to the web pages that were found to meet the criteria (hits), and also a snapshot graphic image of the way that the web page appeared when rendered at the time of indexing.

The invention is applicable to a wide range of search systems. For example, in addition to use with a web crawler and a text indexed word association database (or instead of automated text indexing), the invention is applicable to produce and associate representative graphic snapshots with websites that reside in a human reviewed directory such as Yahoo, wherein subjective characteristics of the data (a text form of which is sometimes termed "descriptors") are stored in the database for comparison with user criteria in finding hits. In that situation characteristics such as an arbitrary business or art classification may categorize the web pages for selection in a manner similar to text string aspects used such as the presence of selected strings, word associations, proximity and the like. The invention is also applicable to automated categorizing processes such as used by Northern Light.

According to an inventive aspect, the graphic image file that is produced is not necessarily identical to the appearance of the page when ultimately loaded by the user after a search. In addition to the fact that the web page may have changed since it was rendered into the graphic file, the rendering is accomplished according to a predetermined display configuration of the crawler when rendered. Nevertheless, the graphic is a useful and very quick means for a user to sift through search results and determine immediately whether or not at least some of the hits bear further investigation.

BRIEF DESCRIPTION OF THE DRAWINGS

There are shown in the drawings certain non-limiting examples illustrating embodiments of the invention as presently preferred. The same reference numbers are used throughout the drawings to identify corresponding elements in the respective figures.

DETAILED DESCRIPTION OF THE PREFERRED EMBODIMENTS

Figure 1:
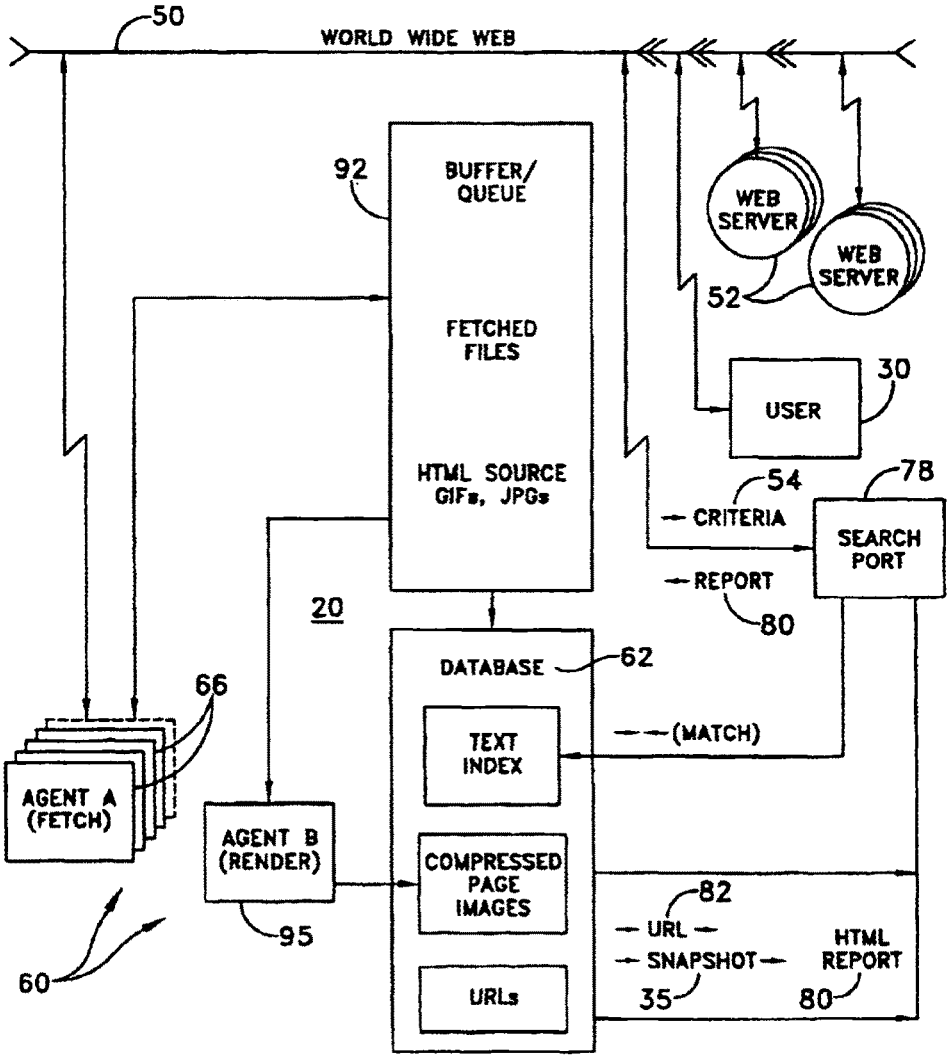
FIG. 1 is a schematic block diagram illustrating a first embodiment of the invention.
Figure 2:
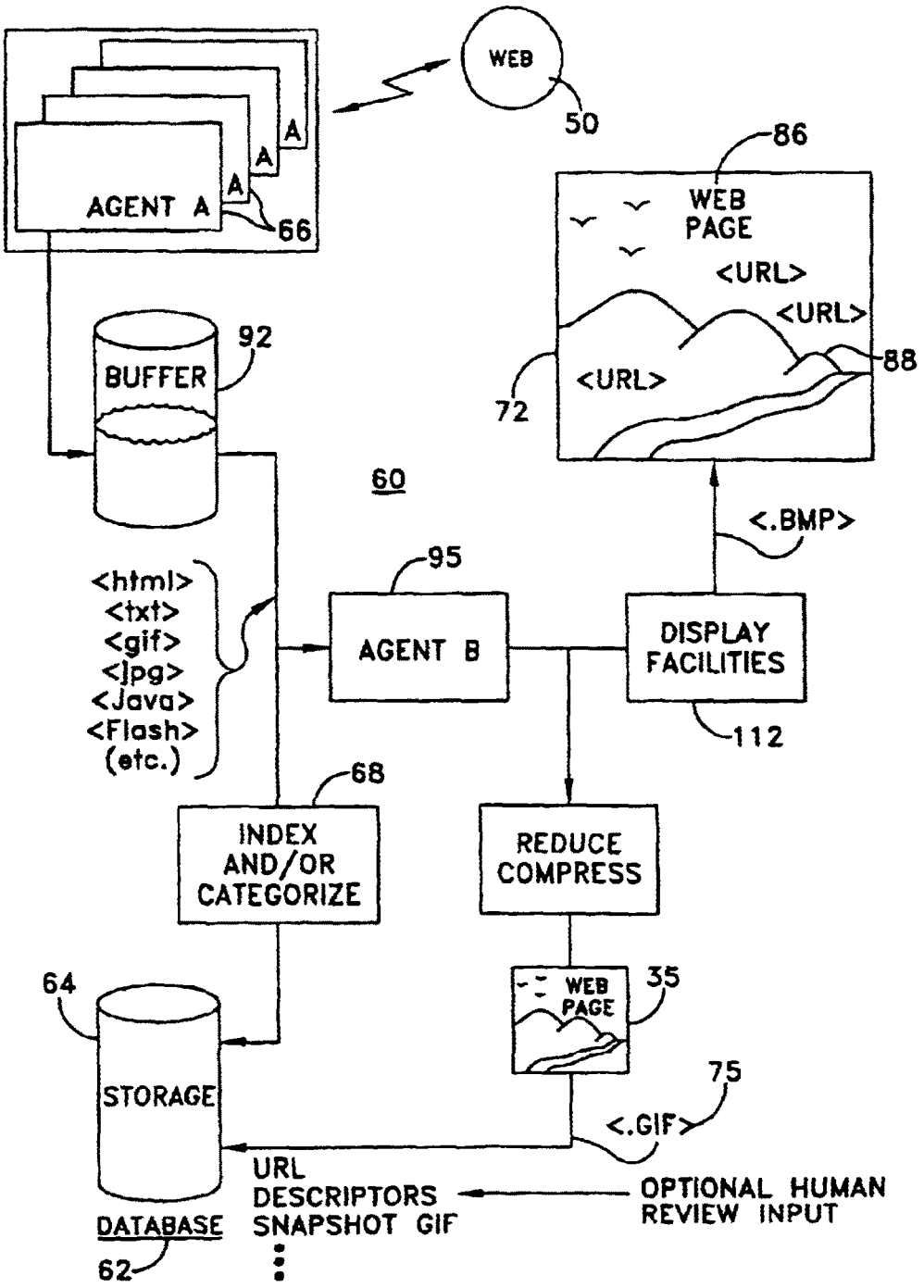
FIG. 2 is a block diagram illustrating the elements associated with collecting, processing and organizing a database of information according to the invention, to be used to conduct searches.
Figure 3:
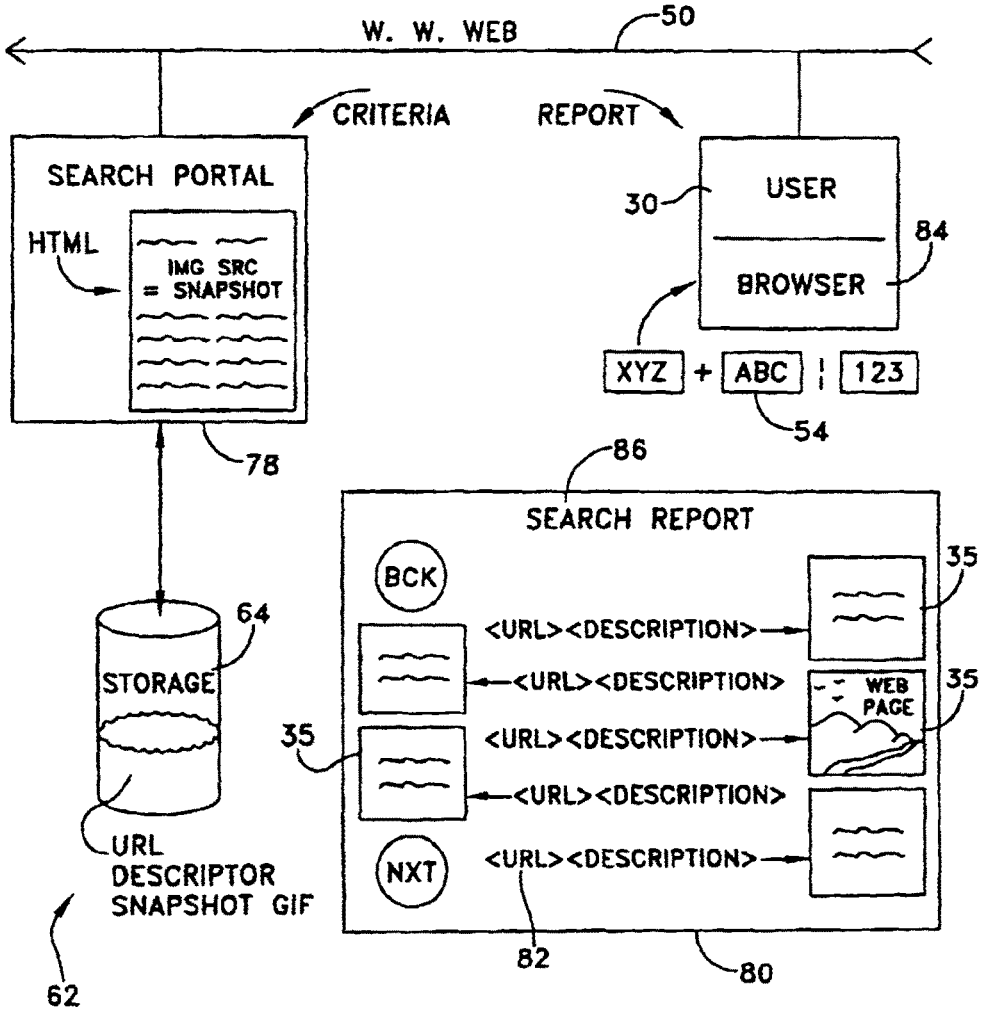
FIG. 3 is a block diagram illustrating operation of the invention in connection with executing and reporting the results of searches.

According to the invention as generally shown in FIGS. 1-3, the reporting of search results by a search engine 20, is improved and facilitated by offering each searcher or user 30 a visual representation 35 of the web pages found to meet the user's search criteria submitted to the search engine. The invention is particularly applicable to an Internet search engine but can also be applied to other networks 50 where the search engine 20 is available for managing user search and selection of web pages or similar files, stored at distributed systems 52 coupled to the network. The web pages, which may be considered data files, are found at addresses to which the search engine can link to load the data files, for example being accessible using URL addressing of the pages as hypertext markup language (html), file transfer protocol (ftp), telnet or other such file types. The data files may have embedded links to other data file or to graphics or other media files. The search engine 20 of the invention accepts user queries that characterize files of interest, searches for the files and reports to each such user the results of the search including network addresses of the files found to at least partly meet the query, enabling the user to link directly to the files, and also a snapshot of how the file will appear according to the most recent rendering performed by the crawler of the search engine.

The invention is described in this disclosure with primary reference to the preferred application to an Internet coupled search engine in which the data files searched are html pages on the Internet or worldwide web 50. Insofar as such files are accessible for loading and review by other users via browsers and search engines, they generally contain hypertext markup language (html) text, comments or tags, formatting commands, and links addressing other files. The data may contain text, media, scripts, programs, etc., and may be addressable at the same network address or a different address. The files may contain information that is not displayed when rendering the file, but nevertheless can be used to categorize the content of the files.

In the preferred example, the basic files (e.g., web pages), as well as the other files and systems to which they refer, are addressable using standard uniform resource locator (URL) addresses, containing a high, mid and low level domain name that is resolvable by a domain name server into a numeric Transmission Control Protocol/Internet Protocol (TCP/IP) address by which packets of data are directed from one computer system on the Internet to another. In this case such packets as transmitted to the system 52 containing the web page to be subject to search request transmission of an addressed web page (see FIG. 1). That system 52 responds by transmitting the contents addressed. The packets are reassembled for or by the receiving system. The browser or a similar process of the receiving system processes the data, normally but not necessarily for visual display on a local monitor.

Although described with respect to browser searching on the Internet, the invention is likewise applicable to other environments such as searching within a company intranet or other group of accessible data stores which have a visual aspect. The invention is also applicable to platforms and user interfaces other than PCs and browsers, such as the various Unix processes which are run on PCs or mainframes, etc. Furthermore, the invention is applicable to various wireless communication architectures. These environments and platforms are not limited to consumer and business use, and have applications in technical, military and other situations as well.

A block diagram showing an improved Internet search engine 20 according to the invention, for managing user search and selection web pages stored at distributed systems 52 coupled at network addresses to the Internet 50 or the like, is shown generally in FIG. 1. FIG. 2 illustrates a succession of method steps and/or programmed operations of the system for building and adding to or updating a database 62 of searchable information. FIG. 3 illustrates a method and apparatus for conducting searches by accepting user queries 54, conducting searches of the database 62 and reporting search results in the form of a composed search report 80 containing visual representations or snapshots 35 that depict a presentation of how the selected pages would have appeared according to a default display configuration at the time they were accessed by the crawler 60.

It should be appreciated that the invention is discussed in connection with processes organized in functional blocks in the drawings. This illustration is helpful to illustrate the input and output sources and destinations, the operational steps undertaken, the various memory stores and data types involved and other aspects. However the illustration is not intended to exclude arrangements, for example, wherein separately illustrated units are sequential operations of the same processing element or wherein illustrated functions or storage capacity are distributed over separated units, especially separate processors coupled to a common network. The separately illustrated or commonly illustrated elements can be combined or separated as convenient, without departing from the invention and while serving the same functions.

The search engine 20 in the embodiment shown in FIG. 1 has an associated web crawler 60 operable to address and load successive web pages from remote servers 52 on network 50, and to index or to otherwise accept or generate descriptors that characterize text data associated with the successive web pages that are loaded. In this way crawler 60 develops parameter information on the successive web pages that can distinguish at least groups of the web pages from one another, and at times can be used selectively to identify a single web page, provided some encoded aspect of that page is unique among the pages loaded and processed. The crawler 60 stores the parameter information and associated addresses of the web pages as a database 62 in a storage medium 64 that is accessible to a search processor 78 that accepts the user criteria 54 and prepares and sends search reports 80 to the query submitting user 30. The search engine portal or processor 78 responds to user submitted search criteria by searching the parameter information in the database 62 and reporting to user 30 at least the associated addresses of data files that met the search criteria when indexed. In particular, search portal/processor 78 reports the URL addresses 82 of web pages meeting the user criteria.

The web pages are generally maintained on web servers 52 (FIG. 1) that are "remote" from the querying user 30 and from the search engine 78, but actually could be anywhere that is addressable on the particular network, including on the user's own system. The web servers 52, in known manner, store text and graphic data or addresses of graphic data found elsewhere. That information is available upon request and in the case of the Internet and other TCP/IP protocol type networks is transmitted in packet form to any user that requests the web page by directing a request to the web server identifying the TCP/IP address of the web server 52, the sender's address or identity, and the address of the desired page. This normally involves addressing using URLs that identify the type of communication desired, such as transmission of an html page (versus a linked graphic or media file, or perhaps a different type of interface such as ftp or telnet), and an address that represents the domain name and a subdirectory path leading to the actual html file or other file.

The same sort of URL addressing is used internally in html pages to address image and other files that may be located at the same web server or elsewhere on the world-wide web, namely by providing a hyperlink that states the network address of the text or other content, as opposed to containing the content itself. Such hyperlinks can also be invoked to move around in a given file, for example from one subheading to another. The hyperlinks are embodied by automatically recognizable codes (e.g., "href=" or "img src=") that appear in the source code together with the various start and stop tags that specify text formatting, colors and other aspects of the page as it should be displayed, for example using a browser. In a browser such as MS Internet Explorer, the source of a displayed page can be displayed by selecting "View" and "Source" from the toolbar.

According to the invention, a crawler 60 collects web page data and is generally shown in FIG. 2. Crawler 60 can be operated preliminarily but preferably operates continuously during operation of the other components to collect additional data and/or to update data already collected. Crawler 60 has one or more fetching processes 66, several being shown in FIG. 1 and identified as Agent A (fetch) processes. The crawler 60 via its fetching processes 66 determines web pages to load and attempts to load them. For example, the crawler 60 may test TCP/IP addresses (known as scanning) or attempt to load pages from particular domain name addresses where servers might be up and running, obtained for example, from a domain name server (not shown). The text portion of any data obtained by the fetching processes 66 from a particular URL address is parsed or divided into discrete terms and statements. These terms and statements are compared to predetermined reserved terms and formats that represent URLs, file addresses and the like. When the comparison indicates that a hyperlink to another file or web server has been found (or that a given string so resembles a hyperlink as to be interpreted as such), the found address is added to a list of addresses and an attempt is made in due course to load a file at that address, thus increasing the field of files that have been consulted.

The general function of the Agent A fetching processes 66 is to obtain the files available from remote web servers 52 and to note the addresses of the files (URLs for the Internet) that when invoked will address and load the file. As a result of communication delays, it is preferred to employ a plurality of concurrently active requests for files so that one file can be processed while waiting to receive another. This aspect is represented in the drawing by plural Agent A processes 66, which obtain the fetched files and store at least part of the fetched files in a buffer memory or queue 92. In connection with html web pages, the data includes html source code, addressed files containing images, audio or other media, which are stored in buffer 92 together with the addresses from which they were obtained.

The collected information from downloaded files, particularly text files, is processed according to a generally conventional text processing or categorizing technique 68 to build a text or descriptor index in database 62 as shown. The database 62 contains an index developed from automatic analysis (generally "indexing") or human review (categorization) of the text and other data, indexed to the URLs of the pages from which they were obtained. Insofar as the automatic or human generated descriptors and addresses are described herein as a "text" index, it should be appreciated that index might represent any attributes of the content of the respective web sites, not limited to words in their displayed text. For example terms in hidden meta tags, comments in the source code, strings found in addresses and the like are also potential data points that may be collected. Any arbitrary characterization that my be automatically assigned or assigned by a human reviewer can be deemed an indexed point. For example, the index could contain information as to the type of links found in the source, the date of the last update, the country of origin or language, whether the site appears to be academic or commercial, an entry for rating content as adult or "general admission" for keying child protection interests, and so forth.

According to an inventive aspect, the crawler 60 that is operable to receive the web pages and to extract the parameter information from them, generates a file 72 of graphic image data corresponding to an appearance of each of the web pages, which is stored, preferably as a reduced-size and compressed image data file 75, in association with the database data respecting the page. When search results are reported to the user (FIG. 3), the search engine reports the associated URL addresses 82 of web pages that met the search criteria in a conventional manner, preferably inserting a hypertext link to each identified page into an html page reported to the user, optionally a short description or excerpt, and also inserts into the report page the graphic image snapshot file by inserting into the source of the report page a link to the stored compressed graphic image file 75. The user's browser displays the search results in conventional form, namely by showing a selectable hyperlink to the addresses and optionally a description or excerpt, and displays a snapshot of how the identified page is likely to appear if or when it is loaded by the user's browser, should the user point and click to the link to invoke the URL of the page hit.

The search portal 78 that performs the search by reference to the database 62 in storage media 64, reports the search by composing a web page containing the search results, assembling the search report using hypertext markup language. The search report contains headers and information identifying the portal and perhaps contains advertising. The search report also lists the hits that resulted from the search. More particularly, the search engine inserts (in list or table form) a text string showing the URL address of each web page hit (i.e., the pages found to meet the user criteria) together with a hypertext linkage to that URL (e.g., an "href=" statement), causing the user's browser to show a link that can be invoked (pointed and clicked) to load the page at the stated address. Such a report is conventional in an html source search report. It typically also has a description or excerpt and may be arranged in a pyramid or hierarchy of categories. According to the foregoing inventive aspect, the search engine also inserts the URL address of the graphic file that has been processed by a further process identified in FIG. 2 as Web Agent B 95, to contain a snapshot reduced/compressed graphic 35 representing the page hit.

The link to the compressed rendered graphic file can be made, for example, by use of a IMG SRC=<domain>/<path><filename> command in the html source. The graphic can be associated with a hypertext link to the hit page URL as well as linking using an HREF=<URL of hit page> command as mentioned above. As a result, the user's browser when displaying the search results also displays the graphic snapshot image, as shown in FIG. 3.

The invention has three main components, shown generally in FIG. 1. As shown in FIG. 2, these include the crawler processes that fetch files from web pages in the universe of web pages to be subject to search, and the processes that index or catalog the pages and render the fetched files into graphic image files. The processes in FIG. 2 can generally be considered the processes that obtain raw data and process it to provide a searchable database and information that may be included in search reports when a web page becomes a hit. Preferably, according to the invention the crawler processes 66 that are associated with collecting the raw data files, which experience communication delays, are separate from the processes 68, 95 that process the raw data into a form apt for storage in database 62 in preparation for searching. FIG. 3 illustrates the processes 78 that interface with a user who seeks to search the web 50, including presenting the web page hit information to the user in html form for browser display.

Referring to FIG. 2., the search engine includes or is associated with web crawler 60, which is an engine that conducts web page addressing, loading and analyzing, and stores representative data in a storage device 64 containing a database 62. The stored representative data characterizes the web pages that the crawler loads and that are analyzed for content by process 68. Of the main activities to be effected by the search engine system (i.e., by the crawler and the search processor), preparation of database 62 allows a search to be conducted more quickly by reference to the processed database information gleaned from the field of possibly-selected files, than would be possible if the search engine attempted to load and analyze the entire universe of files after the user had submitted query 54 (FIG. 3), namely while the user was awaiting search results.

The process of preparing database 62 includes determining URLs (or perhaps TCP/IP addresses or other addressing strings) for the files to be searched, and then loading and analyzing the files to note the occurrence and juxtaposition of text strings. Alternatively or in addition, the files are categorized for other aspects, for example by human review and assignment of arbitrary descriptor categories that tend to distinguish files by their content or owner or type, etc. The files or webpages consist essentially of ASCII characters stored in a text file that is known to be or is identified as hypertext markup language, often having an "htm" or "html" extension on the file name). As a result the ASCII character strings in the web page are searched for combinations of characters that conform to specific code name and character rules whereby they can be interpreted as commands or links or other specific forms of information in html.

Html is a form of standardized markup language in which various tags are associated with ASCII character strings. Many of the character strings and tags used in html webpages concern the appearance of the associated text and the visual aspects that are to be displayed concurrently with the text. Such commands can specify a header, a background pattern, color or complete image, set or reset a font type, font size, capitalization or color, change justification, centering and margins, specify lines, a table or frames, call for insertion of a graphic figure in any of several formats, which may be static or animated, and otherwise generally vary the appearance of the page and the text on the page. The strings also can address additional files.

The encoding of a representation of the occurrence and juxtaposition of text strings is generally known as indexing, and results in a database of information in which each text string found during the analysis of all the files or pages searched is referenced to the URL address where the files or pages can be found. According to the present invention, such indexing can be construed to include other methods for categorizing data files in a manner that allows distinctions to be drawn that are useful for searching, including human reviewer categorization and discrimination for non-text factors such as the revision date, country of origin or the like.

The database 62 is generated by preparing or obtaining a set of characterizing parameters concerning the fetched files, or their addresses or content or the like. Database 62 contains a cross reference between criteria and the identity (normally the URL address) of the file that matches the criteria. Assuming that the criteria concerns a concatenation of terms (e.g, "quick brown fox"), all the URLs of files that contain that string are available by searching for the string. Likewise the URLs of all the files containing the component terms are available ("quick" or "brown" or "fox"), and these terms or phrases can be combined with other terms or arbitrary categorizations to find a page (such as the Quick Brown Fox Hardware Store). The indexing and/or categorization particulars can be objective or arbitrary, and wholly or partly driven by human review or by automated means, and can concern any aspect that tends to be unique to individual files or common to subsets of files only.

Automated indexing and similar characterization systems may seem objective but the results are determined in part by usage chosen by the author of the content, which is to some extent arbitrary. Human review is subject to potentially arbitrary choices by the reviewer. The search database as discussed herein includes any collection of information prepared in a manner that enables search criteria to be compared to stored criteria to distinguish files from one another. The search criteria involves combinations of categorizations and/or text strings and other factors, chosen by the user in an effort to target the files or pages that have a desired subject or include reference to a particular datum. At the same time, each criterion is not applicable to every page reviewed, and as a result it is possible both to collect files that meet a user's criteria and to eliminate files that do not meet the criteria and thus are irrelevant to the particular search.

Referring again to FIG. 2, the universe of files and pages can comprise, for example, all the high level pages of registered domain names on the Internet, plus a series of additional lower level pages. The lower level pages can include all the pages to which the high level pages are linked by hyperlinks in the content of the high level pages and/or frequently encountered subpage names such as "index" and "home". Various such processes are conventionally practiced using so-called web crawlers that are operated constantly, often during low traffic hours, to find, load and analyze (index) a very large universe of web pages.

Conventional web crawlers prepare a database that records and can be used by searchers to select (or de-select) web pages primarily on text strings and Boolean combinations of text strings found in the content of the web pages and indexed in the search engine database. The web crawler/search engine database also can be arranged to record and permit searchers to select and de-select on the type of media linked to a page, on a window of dates, the language of the web site or page, the location of the registered domain, the depth of a particular web page in the directory structure of the target site, and other aspects.

Although it is possible and useful to encode and to select web pages based on attributes that are determined from letter strings found in their text or perhaps in the particulars of their URL address, it is not readily possible for an automated web crawler and associated processor to encode much of the appearance of a web page. In the event that the web page contains a link to a graphic image file, for example, the URL address of the graphic image file, including its file name, will be found in that web page, but the graphic image could have any content and may or may not be consistent with the file name. Therefore, known search engines cannot discriminate among web sites by virtue of most of the attributes that affect the graphic appearance of a site's contents when displayed on a browser or the like. However users can readily discriminate among web sites, particularly some forms of web sites, by appearance only.

The configuration of the user's system also affects the appearance of a web site content when displayed. On the level of the browser, the user can opt to display particular font types, and also can specify font sizes. These configuration choices affect the appearance of a retrieved page even if the page defines specific fonts that are available to the browser. The browser may also permit the user to select whether or not to use the background colors of retrieved sites and other features affecting the display. On the level of the operating system, the user can opt for different display options such as the number of pixels and the color resolution employed. These aspects also affect the display. As a result of such user choices, retrieved web pages appear differently on different user's displays when retrieved. For the most part, differences due to such configuration choices do not grossly affect the appearance of the web site, but they do cause an identically encoded page to appear differently on differently configured systems and/or browsers.

The search/reporting steps of the browser, generally shown in FIG. 3, include accepting search criteria 54 from user 30, for example using a CGI script technique in which the user enters selections including text strings, literal strings of plural terms, additional encoded aspects such as media types, date windows or limits, countries of origin, etc. The user may also select Boolean relationships (AND, OR, NOT, XOR). The search portal may require commands or may permit selection using point-and-click steps. The search engine compares the search criteria to the pre-prepared database of information gleaned from the web pages it has loaded and analyzed from the field. The results are reported to the user by preparing and formatting an html source reporting page into which hyperlinks are entered that name and point to the addresses of the files that were found to meet the criteria. Often the report includes other information such as the date the page was last updated before it was indexed, and a few lines of introductory text from the page, which provide a hint to assist the user in determining without loading the page whether the page is likely to be relevant to the search. If the user finds a link that appears to be pertinent, the user selects and engages the hyperlink. This causes the browser to load the html source found at the URL address shown in the search report, and any referenced files and links therein. However, the page may have changed between the time that the indexing was accomplished and may have totally different content than it had when indexed. The page may no longer exist. In those cases, the search fails except to advise the user that the page formerly held information that might have been of interest.

Deliberate as well as inadvertent "search engine corruption" sometimes occurs. It may be crucial for marketing or other purposes for a web site to be found in user searches on search engines, and it can be lucrative or otherwise beneficial for a web site operator if his/her site is ranked high in the search results for particular terms. Thus, a great number of website operators have ways to misrepresent the content of their pages. Keywords intended to cause the page to be selected and to rate highly in particular categories can be included and may or may not be displayed. Misleading text can be placed in miniscule font at the bottom of a page or misleading text can be hidden by making it the same color as the background on which it appears. Text can also be placed in "ALT" descriptions of images and graphics, thereby indexed by the crawler but not seen by the user. A particular term can be included one or many times to improve rankings, by one of the foregoing techniques, or by overloading keywords in "META" tags included in web pages and not displayed. Another technique is to temporarily post a page to be textually indexed by the crawler/search engine and then to replace its content after it has been indexed, or similarly, meta-refreshing the web page so as to redirect the user to another page address. According to an aspect of the present invention, the user can visually distinguish pages having undesired content and not waste time on them. Search engine corruption using the aforementioned techniques to provide misleading text is averted due to the visual nature of the present invention.

According to an inventive aspect, a system of the type that indexes or categorizes information on web pages for searching is improved by encoding and providing in the search report 80 a standardized graphic representation 35 of the appearance and rendering of each page at the time that the page is indexed. The graphic representation 35 preferably is in the form of a compressed image of the page, described herein as a snapshot, stored in a standard compressed file graphics format at a location accessible to the search portal process 78. The snapshot is acquired when the page is initially loaded by the crawler 60 for indexing (FIG. 2). The snapshot is rendered, converted to the compressed format and stored. When the subject page is selected in a search (FIG. 3), transmitted to the user are the individual snapshots, which have been stored locally to the search portal processor 78, in association with the index/categorization database. In this way the snapshots 35 of the hit page (which may be one of a number of hits that are reported to user 30) is shown when providing the search report.

The snapshots 35 can be contained in formatted image files (e.g., GIF, JPG, etc.). The snapshot image files, or URL addresses pointing to the image files, preferably are stored in the database 62 that also contains the URL addresses of the indexed pages. In reporting search results, the search engine 78 inserts a link 82 aiming to the snapshot image file 35 into the html search results page 80. The search results appear on the users browser 84 as a link to selected pages with an associated snapshot of the page when indexed, as shown in FIG. 3.

These operations impose challenges that are addressed according to the invention. One problem with acquisition of the snapshots is due the very large number of websites that must be physically rendered, namely every website that is indexed and is available in the universe of websites subject to search. The website content, including any referenced image files, must be downloaded by the crawler Agent A process(es) 66 and rendered by the rendering Agent B process(es) at acceptable speeds, and preferably also reduced to obtain reasonably sized image files 35. The image files must be accessibly stored and downloaded from the search engine 78 to the searcher (specifically the user's browser 84) at acceptable speeds as well. The invention applies particular technology to solve these and other problems.

Major search engine portals each have a usually-proprietary "robot" or automated process that crawls the web as described above. In each search portal or system a robot or crawler that accepts or finds website URL addresses, accesses websites by TCP/IP addressing and loads their source code. The crawler robot automatically parses the text of a website, namely dividing the strings found in the source code into units separated by delimiters such as spaces or punctuation. The strings and the succession of strings are compared to stored parameters whereby certain strings are construed as links or formatting commands, which is noted accordingly. The occurrence and proximity of these strings and the free content strings that are to appear as text in the web page when displayed on a browser, are all noted and stored in a database where this information is cross referenced to the URL address of the website from which the page was loaded.

In operating a conventional crawler and indexing routine as discussed, the website text can be analyzed and indexed at an extremely high rate of speed because the page is treated only as a succession of text strings. No processing time is spent to load and process or otherwise handle any embedded or referenced graphics, media, scripting, Java, or animations. Such files are not helpful for traditional indexing and thus are not requested. The html tags that might be used to find and load files for non-text content may be textually parsed, but their associated data files are never requested and not retrieved by the traditional text crawlers employed by the major search engines. In addition to avoiding processing overhead, no time is devoted by the crawler for data transfer that might be needed to request and receive packets containing the graphic or other media files. The load on the crawler is minimized because the portion of the website that is loaded and processed, namely the text portion, represents little "weight" in communications bandwidth requirements, processing time and the like for most web pages. Without the need to download and process large graphic and media files, simple text indexing in the traditional sense by conventional crawlers is very efficient, simple, and fast.

Although simple text indexing is quick and simple, the exact opposite is the case for full graphic rendering of a web page. Before the display of a web page can be completed, it is necessary for the browser to wait so that each and every required file is downloaded. The browser must wait for all necessary files to be received before a full rendering of the display. Additionally, any script or otherwise dynamic content normally awaits receipt of the entire file before processing begins. Furthermore, image, graphic and media files are very data intensive and thus require substantially increased transmission times in comparison to text.

A web page will contain one single text file, but in contrast may contain dozens of graphic and media files. Traditional text crawling by the major search engines require that only the one single text file be transmitted and parsed. By contrast, full graphic rendering employed by the current invention requires that each and every graphic, image, and media file be transmitted and subsequently rendered into a full visual depiction of a web page.

In a conventional web crawler installation, dozens of robots can run on the same processor simultaneously, all executing their individual tasks without regard of the other robots present. Employing a large number of robots on the same computer processor facilitates conventional text indexing. Also, the conventional crawler is only concerned with processing text data. The crawler processes need not include many steps required of a browser to handle the graphical content. Specifically, conventional crawler processes do not include generating and presenting a visual display, which would require additional network communication (to obtain graphics, etc), consume time and processing power, and require devotion of system resources such as the visual display itself (e.g. monitor).

The text data portion of a web page is most commonly five to ten Kbytes in length and is received in less than a second on a typical network connection. The text file is normally the first file sent from the originating web server. Image files and script or other code, if requested, follow afterwards. The robotic processes of requesting a text file, retrieving packets and reassembling the text file, parsing the text file by finding terms within delimiters, and indexing its contents, can be accomplished under normal circumstances in 0.5 to 1.5 seconds. Assuming a one second average processing time, one computer processor operating, for example, 25 text processing web crawler robots (which may be conservative), can obtain and index the text of 25 web pages per second every second. Operating continuously, such a crawler could process over 15 million web pages per week. Certain factors limit the rate at which pages can be processed. Web congestion, long files, long transmission sequences, low bandwidth server connections, and other factors that vary from one website to another and one time of day to another may limit processing speed. Nevertheless, a search engine portal that has several computers with multiple robots devoted to crawling the web, might complete an entire crawling sequence through a reasonable universe of selected web pages, in three or four weeks.

By comparison, complete and total processing of web pages, including rendering all graphics requires a substantial increase in resources. If a typical website has text content of about 5 Kbytes, that same text file may have any number of associated graphic files, each of which is several times the size of the entire text file. All the web page data must be downloaded totally and processed before accurately rendering the web page, because the data may affect the rendering even if the data itself will not appear on the screen.

A website server is usually prompt in sending short files, such as the requested text of a particular page, and short file transmissions are more frequently successful than longer ones due to the additional packet handling for reassembling the file, and the increased possibility of transmission errors requiring retransmission. The browser receiving and processing the graphic file seems to pause or to stick on presenting a particular graphic section during the resulting delay. The transmission may pause at any point, even on the last packet of a number of successively transmitted files. The receiving browser or other processor cannot complete the total and full rendering of the web page, for display or otherwise, until the delay elapses. The receiving computer simply waits before completing the display of the page.

For rendering a page layout including graphics, the browser or page rendering robot normally requires on the average 30-45 seconds per page to receive and process a web page into a graphically visual layout (an approximation that incorporates a variety of factors including changes in bandwidth, server lag, and lost packets which can result in web pages being delayed).

The graphic layout of the page usually comprises a series of image files. Each file consists of or is unpacked into an array of digital data words representing the saturation, luminance and hue or the respective RGB levels of each pixel in an X-Y field corresponding to the display screen area. On a computer running a browser, the image file is loaded into a series of memory locations accessed by the display driver to drive the monitor display, either in the processor random access memory or in the memory of a video display driver card (or both). The process of rendering a page into a visually graphic layout usually requires devoting a full display memory field to this function, and particular aspects of processors are often devoted to handling a limited number of display images. As a result, only a single image processing application or graphical robot can visually produce the intended web page layout on the screen at any one time. In other words, rendering the page layout of the website at its intended dimensions (displaying a full screen) can only be accomplished using a single graphical application or web browser at a time.

Web pages are intended by their creators to be seen at a size rendered at or near full screen dimensions. Obviously, only one full screen web page can be displayed at any given time on one screen, and as a result, only one graphic robot and its associated hardware can be active to render that display at any single instance in time. This situation is thus unlike the way text is processed by traditional web crawlers, wherein a single computer processor is capable of running dozens of textual web crawlers simultaneously "in the background." This is because requesting, retrieving, and indexing text from a web page does not commit visual or display generating resources. Without the requirement to share this type of resource, any number of the text indexing type of web crawlers can run at one time.

Because of the limitations, constraints and resources used for rendering and display, crawling the entire web for the purpose of successively rendering web pages to produce a display can be impractically slow. If the conventional text retrieving robot is capable of indexing 1 page per second, a graphic rendering robot is capable of processing 1 page display every 45 seconds. As a result, a computer running 25 simultaneous text retrieving robots can index an estimated 15 million (15,000,000) web pages per week, but the same computer running a 1 graphic rendering robot would process and estimated 15 thousand (15,000) web pages per week. If there are 100 million web pages in the desired universe, graphically rendering the entire universe of searchable web sites on one computer processor would require approximately 6,600 weeks or nearly 127 years to complete. Even employing 25 different computer systems would require over 5 years to complete a graphical rendering of the desired 100 million web pages.

According to an aspect of the present invention, at least two independent types of intelligent web agents are cooperatively operated to handle different aspects of the job of retrieving, rendering, and processing websites, in a manner that makes it possible to produce graphic data in the form of a compressed or reduced graphic file representing the appearance of a rendered website, and to do so at an acceptable rate. The first type of intelligent web agent (now to be referred to as "Web Agent A") requests, retrieves, and downloads each and every file associated with a particular website, including but not limited to the source code text file, graphic files (e.g., GIFs, JPGs and others), script files, Java executeable files, Flash technology files, Shockwave files, animations, and so forth. Web Agent A is arranged to communicate or pass data into one or more memory buffers or queues accessible to a second type of intelligent web agent (now to be referred to as "Web Agent B"), which siphons out the website files as needed to produce and render complete graphical displays of the web page.

The rendering process by Web Agent B comprises processing the text and html tagging data to prepare a visual representation. All the files necessary to render the image have preferably been obtained by Web Agent A before then, and such files are stored in the buffer. Web Agent B produces a full visual representation, such as a bitmap file containing a pixel data array, which if coupled to a display driver could be used to display the web page layout on the video monitor at full screen dimensions. In short, Web Agent B prepares a visual image as might be provided by a browser.

The visual display of the web page is then compressed by Web Agent B or a process associated with it, to a predetermined and preferably small image size, for example a 2 in.×2 in. image on a 17 inch diagonally measured display screen. This process may involve sampling or local area averaging techniques as known in the art. The reduced size bitmap image then is digitally compressed and/or encoded to minimize storage requirements and to permit quick transmission over an ASCII-only data channel. The reduced size bitmap image can be converted into a JPG, GIF or similar format for an image file suitable for web transmission. That image file, which represents the rendered appearance of the associated web page at a particular point in time, is stored in a mass memory accessible to the search engine. The mass memory can be in one or more hard drives, ram caches, writable CD ROMs or other media that is useful as a high capacity RAM. The mass memory can be a peripheral on the search system or can be accessible to the search engine, for example using communications over a local area network, provided that the image files are very quickly recallable using a minimum of data communications and/or communications that are direct rather than over the web.

The mass memory can have a subdirectory naming system and file naming system based on the network addresses or URLs of the web pages from which the graphic files were generated, or alternatively the files can be arbitrarily named or stored and can be found using a cross reference table in the search engine whereby the address or URL of the web page and its associated image file are cross referenced.

The search engine memory also comprises text indexing data or human categorization directory data (or both), that is obtained in a conventional web crawler manner and includes an association between the text data found at each web page and the web address or URL of the originating web page. In this way, the text indexed or categorized data, and the graphic file location, are both indexed to the URL. By selecting a URL, the search engine can call up the graphic file representing its appearance when rendered at some time in the past. After receiving a selection containing one or more text strings, Boolean combinations, file extension types or other criteria, the search engine can determine the matching web pages, report their URLs and provide a graphic file showing a miniature window version of how they would have appeared if loaded by a browser at substantially the time when their data was loaded and indexed.

Web Agent B preferably has additional functions, including keeping status information such as storing log files containing addresses and/or linked file names that have been attempted and obtained, optionally including a queue of files that presented problems when first tried and should be re-tried or after a time will be rendered with missing-graphic gaps, web addresses that have been completely rendered, etc. Preferably the logs and status indicators are sufficient to permit an operator to monitor operation by reference to by readouts or by displaying stored data. Web Agent B also preferably generates error messages and/or alarms in the event of any crucial errors. Status readouts available can include rudimentary data such as the current URL being processed, the rendering state of the current URL, the number of URLs processed since inception or last clear, any error messages and so on.

The search engine can comprise one or a number of processors and the processors can be in direct communication or linked on a local network or other arrangments, the key being quick access to the stored database of data representing the universe of web pages that have been processed and therefore are searchable. The search engine accepts user search criteria in a conventional way, such as using CGI form boxes to enter text strings into an associated search engine entry html page that is addressable by a browser. The search engine permits selections to be made according to at least one search criterion and preferably accepts a variety of different criteria types and combinations. These aspects of the search engine can be of the type conventionally used by current search engines such as Hotbot, Yahoo, Alta Vista, Northern Light, etc. The search engine is operable to select web page hits as a function of user supplied search criteria and to determine the URL addresses of web pages (hits) that wholly or partly meet the criteria. In addition to determining the URLs of hits, the search engine may store and retrieve a brief exemplary text string such as the initial few lines of text in the web page hit.

The search engine reports search results to the user that entered the search criteria, by composing an html source page and transmitting it to the user. This html report page may identify no hits or a long list of hits, depending on the search results. In composing the report page, the search engine typically shows the search criteria used, and displays indicia summarizing or similarly identifying each web page hit. For example, the search report can identify hits by the URL of the originating web page. Preferably a short text selection such as the first few lines of text is shown. The html coded report page prepared by the search engine includes an associated hyperlink to the URL of each hit. The URL can be shown in plain text and provided with an associated hypertext link (href=[URL]). The user reviews the URLs, sample text or other information and activates the hyperlink of a selected web page identified in the results, thereby loading the web page presently found at the address of the originating page when processed by the crawler robots.

According to the invention, the composed search report page prepared by the search engine includes but is not limited to the URL of each web page, the title of each web page, a description of each web page, and a graphic depiction of each web page. The user's browser immediately loads the source code, which contains the text portion of the search report. In processing the source, the user's browser encounters the links to the image files that were included by the search engine when composing the search report page and obtains the image file. Preferably the report page composed by the search engine places the graphic for the web page hits immediately adjacent to the associated text and hyperlink. The graphic image was rendered under certain assumptions as to the display configuration and represents a snapshot of the web page frozen in time. The snapshot is at least an approximation of how the web page will appear if the link is activated and the page is loaded by the user (i.e., if the page is unchanged and the user's display configuration is equal to the default configuration assumed by the Agent B of the invention). Unless the page has been substantially changed by its owner, the graphic depiction will substantially assist the user in sifting the pages that are definitely interesting versus possibly interesting, neutral, unlikely to contain pertinent material or definitely irrelevant.

It is an aspect of the invention that the assets and processing power of the search engine system are proportioned to coordinate the operation of Agent A (for fetching) and Agent B (for handling image content), whereby neither one substantially lags the other. Agent A is subject to communication delays involved in requesting, receiving and storing the needed files from the internet, which can delay a single robot, but in fact is ameliorated by running multiple copies of Agent A in the background. Agent B has more data to process, but due to the preloading by numerous Agents A in the background can process the data quickly from local copies. Agent B is free to monopolize the display in the foreground while multiple Agents A in the background acquire necessary files from the internet and feed them into a temporary data buffer.

In view of the communication delays and to maintain the pace, it is presently preferred that 32 web agents of type A operate in conduction with each web agent of type B. Thus a plurality of web agents of type A continuously fetch and feed into a buffer or queue all web page files of targeted web pages, including their source code and their graphic images, such as JPG, GIF, Java, Flash, etc., all being stored locally. One or more web agents of type B, preferably one for a number of Agents A (e.g., 32) continuously processes and removes files from this buffer to produce and render one web page snapshot image after another. Concurrently with this process, the text portion of the web page data is indexed or categorized.

The ratio of Agents A to Agents B can be determined from experience such that the contents of the buffer or queue remain substantially stable for the particular search engine. Alternatively, the ratio can be changed on the fly so as to keep Agent B constantly working and to keep the size of the buffer or queue stable. If the queue continues to grow, the ratio of Agents A to Agents B can be reduced, thereby committing more of the available CPU time to Agent B, which should cause the buffer to shrink. The buffer should not be allowed to shrink indefinitely, or Agent B will become idle or will lose efficiency or even stall, waiting for complete sets of web files to become available. Preferably, an optimal buffer size is assigned, such as some hundreds of MBytes. Additionally, this buffer is maintained relatively static by the deletion of data after it is used by Agent B. After startup of an estimated optimum ratio of Agents A to Agents B, additional Agent A processes can be added until a substantial portion of the available communications time is filled with active Agent A messages. If the buffer grows continuously, Agent A processes are reduced in number relative to the number of Agents B, and vice versa. Inasmuch as the optimum ratio is in part due to communication delays due to web congestion, the ratio of Agents A to B can be varied throughout a processing day.

Web Agent B continuously renders and processes web pages one after another according to a specified queue. Web Agent B does not suffer from the limitations and overhead of requesting and transferring files over the internet because these problems are solved by the team of web agents of type A, for example thirty-two of which may be busy addressing and loading files from different sources.

In one embodiment tested, a single web Agent B was employed in a computer engaged as described above. Conventional browser and display driver routines were used to render bitmap display files from html pages that had been revised such that all included image reference links pointed to graphics files that had been previously downloaded by one of the plurality of operating Agent A processes and stored in the queue or buffer, namely on the system hard drive. An image conversion utility then converted the display bitmaps into a GIF image files under file names referenced to the corresponding URL of the originating web page. This arrangement proved to be an efficient and fast method to obtain snapshot renderings of web pages. Web Agent B in such an arrangement controls and manipulates all processing and system resources for graphical display but is not held back by the delay of retrieving and storing of the necessary files, which is collectively performed by all the Web Agents of type A, running as concurrent processes in the background and thus not requiring many of the system resources, including the display buffers and drivers. The system proved efficiently cabable of rendering at least one web page per second, and if run continuously would render 86,400 pages per day, 604,800 per week. This may seem like an adequate rate, but assuming a desired universe of 100 million pages, a single computer system crawling at that rate would still need approximately 3 years to complete a crawling cycle. During that time, the content of most of the web pages would have been changed. Therefore, the invention is preferably applied running a number of computers operating concurrently. Networking to a common database and running 18 computers concurrently would allow a complete rendering of a desired 100 million web sites every 2 months. It is preferred that such a 2 month cycle be utilized to maintain a fresh and updated database of graphic snapshots.

It is not unusual during an initial attempt to retrieve a web page using a browser, including retrieval of its included or referenced graphic files, that at least one of the files is not successfully transferred. This may be due, for example, to congestion or other factors causing the website server to time out and issue an error message. Sometimes a file is garbled in transmission and this is detected by the receiving browser, which visually marks the displayed page to show that there is a missing file (e.g., a rectangle is placed at the image position with a red "X" indicating that the transfer was unsuccessful or the received file was defective and could not be decoded and/or displayed as an image). In that situation, the browser "refresh" function often can be invoked to make one or more additional tries to retrieve the rest of the webpage, at the user's point/click command.

According to the invention, in such a situation a built-in redundancy deals with damaged or missing files. Web Agent A is responsible for retrieving and storing the graphics files, and all associated files of a particular web page. In so doing the originating server or an intermediate router may time out or transmit a damaged version of the file. If a file is not received or a received file is defective, which is not infrequent when browsing, Web Agent B of the invention detects that the file is missing or defective (in other words, Web Agent B notices that the necessary file is in fact, not in the buffer as it should be). Web Agent B can be arranged to attempt one or more times to retrieve missing files from the address specified in the html source code, (i.e. to obtain the graphic file again "live", directly off the web). Preferably, however, if Web Agent B is ready to render a file and one or more graphic files is not found, then Web Agent B can signal one of the Web Agent A processes to attend to fetching the file, and during the delay Web Agent B proceeds to render another file whose component files are all available. With a redundancy or retry capability, the system is likely to successfully render the whole webpage, with all its graphics and all its associated files, more dependably than a browser responsive to live file downloads. In fact, this redundancy brings the success rate to nearly 100%.

The respective crawling, communication, indexing, and rendering program functions can be written in any of a variety of available programming languages and can run on any of a number of different platforms. The program has been found to be readily embodied in C++ running on a Windows NT operating system.

It is an aspect of the invention that available communications bandwidth is used efficiently. The multiple Agent A processes operating concurrently are such that the usual reason for waste of communications time, namely waiting for a response from a remote web page server, is minimized because delay experienced by one of the Agent A processes is used by the other Agent A processes that are operating at the same time. The invention can perform on any bandwidth connection, including 28 Kbps. Of course a high bandwidth connection is preferred, such as one or more T1 or T3 connections (if not even higher).

Apart from the example of Windows NT, the Unix platform is alternatively useful according to the invention due to its capability of handling multiple simultaneous processes. The respective software robots can run on the Unix platform as applications programmed, for example, in C, C++, Perl or one of the other languages. To finish crawling cycles reasonably promptly, in a preferred arrangement numerous computers are employed simultaneously, each having its own connection to the internet and each employing its own embodiment of the current invention. The computers can reside on a network and feed off of and simultaneously contribute to a common database maintained by one of the computers on the network.

The two general functions associated with preparing the database of information which is then subject to search and reporting, are the functions of retrieving all webpage data (performed by Web Agent A), and generating a "snapshot" file from the data (performed by Web Agent B). It is found that these functions can operate concurrently with or apart from the search engine processor or processors that search the database of information and return results to the requesting user. The preferred embodiment, however, is to perform all processing in regards to rendering, resizing, and compressing the snapshot prior to being accessible to surfers on the web. A cycle of processing (crawling, indexing, rendering) preferably is completed and the index and snapshot files that result are loaded into a database or are used to update a database, maintained on the server that accepts user search criteria and composes and sends to the user the search results.

Web Agent A attempts sequentially (or randomly or otherwise) to load all the web pages listed in a large database of URL addresses that were compiled previously from various sources. A compilation of URL addresses might be built up by trying to download composed URLs based on dictionary words (e.g., http://www.aardvark.com . . . ) or company names from a name directory (e.g., http://www.acme.com . . . ) or known URLs from a domain name service, or even all sequential string combinations one after another. The tried and true way to compile a list of addresses for a web crawl is to start with URL addresses from an existing compilation of web page addresses, such as a domain name listing; to load each one sequentially; and to scan through the source of the loaded pages for all the hypertext links to other URL domain names and/or URL web page addresses. These latter linked web pages are then added to the compilation of URL addresses, and crawled (loaded and also scanned for links) at some later time.

The search system of the invention preferably permits anyone to suggest a web page to be added to the universe of searchable pages. The suggested web page is added to the compilation, and the search engine's robots crawl the web by loading the suggested page, noting and loading the pages linked to the suggested page and continuing on to the pages that are linked to the linked pages, etc. Duplicates are removed. URLs that have been recently visited can be flagged for deferred reload, or removed.

Another preferred method incorporates the use of a human reviewed and compiled database. A "human surfer" or web page reviewer may be more dependable than a robotic agent in categorizing the content of web sites (e.g., "The Electric Factory" is the identifier of a concert promoter and supplier of tickets to entertainment events). Both methods can be utilized to compile a database of websites. A team of human surfers can be employed for the task, each visiting successive websites and making determinations, for example, as to an appropriate title, description, category or the like. The current invention provides additional enhancement to a human compiled database in that the content of a website is even more quickly apparent if any descriptive terms or titles are considered together with a snapshot of the content, even if miniaturized to the extent that most or all of the text shown in the snapshot may be too small to be readily discerned.

In a preferred arrangement of the invention, the processing is accomplished in a network of programmed processors that are in a data communication with one another and each of which has a TCP/IP communication link to the web. The database containing the universe of crawled or to-be-crawled target web sites, which may number in the millions, can be stored in a controlling processor or can be part of a shared data store used to allocate individual URLs to client computers on the search system network, such as by permitting Web Agent A to obtain the next URL from the list and to flag the URL as in use. It is not strictly necessary to use the network paradigm. Instead, each Web Agent A or each client computer running multiple Web Agents of type A can contain its own database with a subset of the URLs of the universe, and the databases of a number of robots or clients can be synchronized periodically to eliminate duplicates, flag URLs after they have been crawled, and similarly updated. In a typical application, the database serves out a URL to the next Web Agent A in the queue and moves an index or "pointer" to refer to the next URL to be served out.

Web Agent A receives the URL, makes a TCP/IP request for the web page over the web, and attempts to download the source code and all the necessary graphic files and data needed to render that website. Web Agents of type A are preferably programmed to "patiently" request and await download of files, but also intelligent as to which of the files to ignore (for example audio files are ignored) and whether to continue to attempt downloading if successive attempts have been unsuccessful. Integrity, byte count, parity and similar checks can be performed to ensure that the download is complete and correct.

In dealing with websites containing "frames," which are actually multiple documents that are loaded and displayed in tandem at a defined and potentially variable portion of a browser display screen, each document typically has an end-of-file code and issues a download complete message to the Operating System.

Often a framed web page can accept and display any of a number of other web pages as an inset frame. This complicates matters in that the end-of-file that actually concerns only part of the framed page might erroneously trigger the Web Agent to move on to the next website and to process the frame but not the framed content.

Frames also present a problem for the crawler robot regarding embedded html links to other web pages. The owner of a frames web page can include html links to web pages of others. If a surfing browser attempts to load the linked page by selecting (clicking on) the link on the frames web page, the browser will load the linked page but it will be within the frame of the first web page owner. The browser is not linked independently in that case and instead is linked through the frames page. Thus the html target address that appears in the browser toolbar and is recorded in the browser's history list is not a link to the selected site. Instead it is a link to the frames page, with a modifier that identifies the selected site. When that target address is invoked, the frame is loaded and the linked web page is inserted into the frame.

In queuing embedded links found on pages for processing, Web Agent A distinguishes framed links from direct links. When processing a framed page, preferably, the crawler invokes the framed page's internal links to find and queue additional links, but does not treat every framed link as a new web page. Insofar as Web Agent A encounters websites with frames, it processes the data local to that web site and checks for the presence of a website with frames. When a frame page is detected, the Web Agent A checks for a download complete message (end-of-file) for every framed element and processes the text and graphics of the frame and the contents both.

Web Agent A preferably detects dynamic occurrences that are programmed into web sites, from the html source code that is received. Agent A can keep only a portion of the content of a particular file, such as the first frame of an animated GIF, or can wholly ignore the file, such as an audio file, a data entry form script or video clip, etc. There are a variety of situations in which a web site may be arranged to display text or graphics sequentially or conditionally, or to link the user to different files. These include automatic re-routing to a further link after a delay or after a user input such as a mouse click, pop up windows for temporary display of a graphic on top of a background, CGI prompt boxes for entering data, data that varies inherently such as video windows, sound files, animated GIF images and other similar occurrences.

According to an inventive aspect, Web Agent A of the invention deals with changing data by loading as much of the text and graphic data as the target web page will supply, and storing a sufficient collection of the graphics and linked files to prepare a static version of the target page upon initial access. This requires Web Agent A to search the source code received from a site for indications of dynamic content and to suppress the dynamic aspect of the content. However, the dynamic aspect is preferably not omitted entirely, and instead is limited to a static display of the initial content encountered.

Accordingly, sound files (WAV, MID, MP3, etc.) are suppressed and ignored. For example in downloading the html source, Agent A deletes links, as a function of their file extensions, before storing the file, and of course does not attempt to download the files themselves. Animated graphics preferably are partially loaded (e.g., only the first frame of an animated GIF) or the graphic files are fully loaded by the Web Agent A but are only partly processed by the Web Agent B. Video content can be processed to obtain an initial frame, but preferably video is ignored and is replaced by a link to a static graphic that marks the video and the file type. For example, MOV video files can be marked by a static Apple Quicktime icon, or ASF files marked by a static Windows MediaPlayer static icon, etc. The static markers preferably are chosen by file extension (e.g., for video, RAM=RealPlayer, ASF=Windows MediaPlayer, MOV=Quicktime), or a generic marker is used for all these formats, or perhaps only for the generic formats that all the players can process (e.g., MPG). Either Web Agent A or Web Agent B can process the target site to link to or to present the static display marker for such files.

Similar markers can be used to indicate the presence of media that is not displayed. For example, an icon or character (e.g., "_") can indicate when a link to an audio file is detected. As in the foregoing discussion of video, the icon also can be chosen as a function of the file extension to indicate the type of audio file found, such as WAV, MID, MP3, etc.

According to further aspects of the invention, pop up windows are ignored or suppressed. Dialog boxes, unlike pop up windows, are somewhat more complex and may obstruct the display of background page features when displayed. A dialog or data-entry CGI box, may suspend the processing of a page until the dialog box is handled. Rather than permitting a dialog box such as a name or password box to suspend operation of Web Agent A, a dialog boxes is detected and triggers running of a "cancel" routine in response to a dialog box. Assuming that the site is operating password-control or a similar process, that process is discontinued for failure to enter the password or the like, but Web Agent A can continue on and may obtain additional graphic file data or text after the dialog box or similar prompt has been passed.

Animated GIFs and other changing features can also be identified by an icon indicating the presence of that feature. Preferably these animated features are selectively processed to provide a static image. Animated GIFs and some other technologies such as Macromedia Flash, provide an action sequence in the form of a plurality of images that are displayed in quick succession, normally in a loop. It is a problem with animations, especially those pertaining to Macromedia Flash Technology to select which frame will be captured or selected as representative of the animation. Animated GIFs begin with a graphic and the subsequent "frames" may be limited only to those pixels that have changed color from one frame to the next. Flash Technology usually begins with a blank screen or blank square. Choosing the first frame of a Flash movie as the designated frame to process and render would certainly be unaccepteable. According to alternative solutions, the Web Agent B can employ a timer to wait a predetermined time before capturing the rendered image in a file of the type that starts as a blank or fades in. It may be a matter of luck what in particular will be present at the moment captured in the changing portion of the display. An alternative is to generate a static image as a sum or average of two or more changing frames, which may produce a smeared static image. Another alternative is to disable the Flash plug in by a suitable message to the target site when loading the page. Disabling the Flash plug may eliminate any graphic data, namely if the website operators did not provide a static HTML page as an alternative to be presented for users who are not outfitted for Flash. Often, a user without Flash is presented with a blank screen with a tiny caption at the bottom reading "If you do not have Flash, click here." A rendering and subsequent snapshot of a screen similar to this could be misleading to the user if viewed within the search results of a search engine, so a timed capture is preferred.

It is an aspect of the current invention to provide an icon or similar indication within the search results as to whether or not a particular website contains Flash Technology. This alleviates possible inconsistencies in processing and rendering a Flash movie, and subsequent interpretation by the user of a search engine who may be viewing the snapshots. Moreover, for Flash and similar technologies that are optional for users, adding an indication of their presence benefits users of the search results. Specifically in the case of Flash, a user who has loaded the Flash plugin or otherwise has the capability to process the content will prefer to access pages that contain Flash content if other factors are equal. Users with browsers incapable of processing Flash technology might be forewarned that their browser may have difficultly rendering that particular website, or at the least would be neutral about that aspect of the web site. The use of Flash, RealAudio and other "value added" technologies is often an indication that a particular website has superior content.

Therefore, in a preferred embodiment, the presence of Flash content is detected. A static page is captured according to one or more of the foregoing alternatives, preferably by disabling the Flash Plug-in. A conventional static graphic is displayed in the snapshot image, and adjacent to the static graphic an icon is inserted to show that the site is a Flash site. The same technique can be used to identify other dynamic displays, such as Shockwave Movies and the like, preferably using distinct icons for each type.

In the preferred arrangement shown in FIGS. 1-3, each computer employed by the search engine system has one database, a plurality of Web Agent A's, and a single Web Agent of type B. While the Web Agent A's are occupied with downloading necessary text data and graphic files in the background, the single Web Agent B is busy in the foreground rendering pages and performing coordinate based screen captures. Most commonly, screen captures are performed at a bit depth or resolution of 24-bits, and thus comprising 16.7 million possible colors in the captured image. To minimize data overhead and to maximize efficiency, a coordinate based system is utilized to execute the desired image capture.

By operating Web Agent B in the foreground, the invention can take advantage of certain display facilities without corresponding processing overhead. Such facilities may include, as available, display processing hardware, software, firmware, coprocessors, memory caches and possibly peripherals such as display driver cards, which might normally be used to facilitate fast updates to a display during the foreground operation of a program.

According to an inventive aspect, the system as described can be configured to operate using a plurality of independent computers that are in data communication (e.g., on a common network, or having access to a particular memory store either concurrently or by virtue of preparing a mass memory media such as CD ROMs containing the storage media database, using one or more computers, and then processing the database for searches using one or more additional computers. In one particular arrangement, one computer (or a subset of a group of computers) exclusively runs Web Agent A processes, for downloading data, files, media, graphics, etc. This large number of Web Agents of type A or processes incorporating similar capabilities, deposits downloaded files into a datastore, such as a hard drive, removable drive, or the like. The deposited data can then be transferred via network or on movable media to a different computer running Web Agent of type B.

Web Agent B processes the data to provide reduced/compressed web page images or snapshots on graphic data files. This second computer running Web Agent B accesses the datastore to render and process websites according to a specified queue. The point is that it is not necessary to have both types of Web Agents on the same computer to enable proper execution of the system, and it may be efficient to separate these functions as described. Separation of the index preparation function in which the storage database is processed to ready it for searching, and the searching and reporting functions in which user queries are accepted, the storage database is searched and a report is composed and reported, can also be separated onto additional computers that each serve particular functions. In this way, operating together and preferably including allocation of additional resources at any processing and communication bottlenecks, the system can obtain data, prepare the data for searching by preprocessing the data, including producing graphic image files, and conduct and report searches via interaction with remote users.

In a preferred form of the invention, both types of Web Agents run on the same machine. When one of the Web Agents of type A downloads a web page, it stores all elements of the page, both text and graphics and including files that may be linked to each subject page but stored at a a different server address, and saves the URL address and the associated file names. The URL is added to Web Agent B's input queue. All of the Web Agents of type A perform this same process, namely attempting downloads and when a download is complete, placing that URL in the Web Agent B's queue. In this way the Web Agent B normally cannot outpace the Web Agent As, even though the latter are occupied to some extent with waiting for transmitted data to be sent by a remote website server.

The Web Agent B undertakes processing after all the files necessary to complete the processing have been downloaded and accessibly stored. For example, Web Agent A or Web Agent B (or another process such as a process that parses the received source code for text indexing) scans through the source code and thereby determines the files that are needed for processing, namely the files or addresses to which hyperlinks are found in the source code. In an embodiment in which Web Agent A handles this process, the web page can wait to be queued for Web Agent B until Web Agent A has successfully loaded and stored all the files. Alternatively, a list of the associated files can be prepared by Web Agent B or by another process with access to the source code, and Web Agent B can check the list before attempting to process the data for the web page. In any event, preferably the processing capacity of Web Agent B is substantially devoted to processing pages that are complete when their processing commences.

Web Agent A, or another process, can be arranged to continue to attempt to load any of the necessary files that has not been loaded. Alternatively, Web Agent B can undertake a new communication on the web in an effort to retrieve the missing file, or can queue one of the Web Agents of type A, or another process, to obtain the file or to reload the missing file(s) or perhaps the entire web page and associated files. Reloading the entire web page deals with the possibility that a file that is found to be missing or unavailable may no longer be linked in the web page source code, and thus is unnecessary. Discontinuance of the link might also be the reason why the file has not been found (i.e., it was removed and deleted).

Performing from locally stored text and data files, Web Agent B can render and capture graphic image files or snapshots at an improved rate. In an embodiment wherein one Agent B and several Agent A processes were operative on one computer to accumulate stored files locally and to queue Agent B, Agent B was found able to produce graphic snapshot files at a rate of about one web page per second. This is much faster than downloading and rendering one page at a time as such would be the case with a normal browser, wherein transmission waits make the typical rate one web page per 45 seconds.

The rendered image file is captured from the display buffer memory of the operating system, and then is resized, processed to increase image quality, and compressed. It is then stored on disk in a standard format under a file name associated with the URL of the originating web page.

Upon completion of a full crawl, rendering of each and every desired web site, and full data storage of the resulting graphic snapshots, the search engine database is ready to accept user queries. The user presents combinations of text string expressions in a known manner. According to the same sort of search criteria known in other search engine applications (e.g., HotBot, Alta Vista, Yahoo, etc.), the criteria are compared to the indexed text information. By whatever means used (e.g., all words, any word, exact phrase, Boolean combinations, with or without results ranking or categorization, etc.) the search engine selects and prepares a list of the web page hits discovered by comparing the search criteria to the contents of the indexed database.

A report listing is prepared by generating a reporting web page in html source code, which is then sent to the user. The reporting web page includes a list of hits wherein each entry on the list comprises an html link to the URL from which the associated web page was downloaded. Preferably, and as already done with most search engines, the entries also include at least a line or two of text from the web page, such as the first three lines. Additionally, according to the invention the entry also has an html link to the graphic file on the search engine computer where the snapshot of the rendered web page is stored. This link can be an IMG SRC=[path][filename] command.

When the user reviews the search report using a browser, the browser inserts the graphic snapshot image adjacent to the listing of the URL link to the subject web page. Thus the user can determine whether a page entry in the search results is of interest, not only from the text information included with the URL link such as a description and title, but also from a small size presentation of what the web page looked like when it was indexed.

If the user is interested in reviewing the web page to which the search report entry is directed, the user can click on the hypertext link to the URL of the web page, whereupon the user's browser loads the web page directly from its original web page server. The snapshot image preferably is associated with the hypertext link redundantly, so that the user can click either on the hypertext link or on the snapshot image and in either case will be linked by the URL to the originating web page.

There are some timing issues. Between the time that the web page was downloaded and the time that the user clicks on a search result entry to review the page, the contents of the page may have changed. If a website operator updated or changed the layout of that website since it was rendered and processed by the snapshot software (Web Agent A and Web Agent B), it is possible that the visual aspect as seen through the user's browser no longer coincides with the snapshot image in the search results. Nevertheless, the snapshot normally shows a mostly consistent visual representation of the current content of the web page.

Numerous algorithms were tested to generate the ideal snapshot from the raw image data, (effectively to convert a bitmap image in the display memory of the computer to a GIF or JPG file to be stored on the disk of the search engine computer). It is utterly essential to the performance of the system to obtain a high image quality and small file size. However, it is a fact of computer science that these two objectives contradict each other. Under normal circumstances, you can have one or the other, but not both. The higher the image quality, the larger the file size, and subsequently, the longer a user of the search engine has to wait for the snapshot to download. On the other hand, creating a small file with less data, will result in a faster download for the user but will also result in poor, unacceptable image quality as it pertains to the snapshot. Not all algorithms are programmed the same, and in fact, some are found to be superior to others.

The algorithms necessary to control resizing, image quality, and compression are programmatically controlled to create the resultant graphic snapshots. To provide a perpetual, never ending crawl and graphical rendering of websites on the internet, it is necessary to automate all functions, including those found in commercial software so that they may be performed without human intervention. Web Agent B, upon complete rendering of a web page, programmatically manipulates the aforementioned algorithms and subsequently ensures the proper storage of the resulting graphic snapshot onto disk. Additionally, Web Agent B performs a test to determine whether the graphic snapshot is of a higher quality in GIF format or JPG format. It should be noted that new algorithms or other existing algorithms may be operable and may be preferable in other operating situations.

Obviously individually resizing, sharpening, compressing, and converting each and every bitmap screen capture to produce the desired representative snapshot would prove prohibitive. A manner by which automation and speed to perform this process is warranted. An element of the snapshot software system is to programmatically control software to perform these actions, for example by manipulation of subroutines from commercial software. This can be accomplished using C++ programming to access certain files and processes normally regarded as internal to the computer operating system. In particular, the memory locations containing the bitmap image intended for the browser display, generated by the operating system (e.g., browser, display drivers, etc.) is co-opted and used as the source file for generation of a compressed graphic image file in an efficient format for storage and data transmission. In particular, a bitmap-to-GIF or bitmap-to-JPG conversion is effected on the contents of the display buffer stored in RAM. Exactly which conversion is determined by Web Agent B.

Upon the completion of processing the original bitmap screen capture into a snapshot, all the raw data files used to render the image now captured are deleted to prevent the data store from overfilling. That is, the original html source code can be deleted together with the graphic files addressed in the source code and downloaded for inclusion in the rendering, leaving in storage only the representation of the web site in the database by its URL address, its text indexing and/or categorization and the ultimate graphic snapshot in an image file cross referenced to the stored address. The bit size of the graphic snapshot file is approximately 1/200 the size of the original data. By automatically and continuously deleting raw files from the data store after processing, the necessary data for searching and reporting with a rendered depiction remains available (albeit a small depiction), and storage capacity requirements remain manageable.

A popular search engine or website portal may receive numerous server requests per day. The search engine opening page may have numerous included text, graphic and interactive elements, each element requiring a communication request for transmission of a data file. Top search engines are visited by millions of users every day, and each search can generate numerous "hits". Some of the search portals personalize the presentation to users. If a search engine is visited by millions of users per day, it has to serve multiple millions of operations and data transfers. According to the present invention, the search engine can report improved information without the corresponding overhead.

Search engine visitors are very impatient and tests show that they are not willing to wait very long for results to be reported. The invention expedites the search and search reporting process while improving the content of the results, and encourages users to remain loyal to their preferred search engine.

Conventional search engines report results in a format that apart from advertising and preset information is limited to text and text formatted as links to the URL addresses of pages in the hit list. This textual form can be reported in a very small file size as compared to the number of hits reported, thereby limiting server overhead and decreasing internet download time. If a browser was arranged to attempt to load and render snapshots during the receipt and display of a search report, a serious technical challenge and communication load would result.

According to a further aspect of the present invention, the snapshot rendering feature is preferably enabled and disabled by user option, which can be a point upon which the user personalizes his/her access to the web portal containing the search engine of the invention. For this purpose, the user can be assigned a code that is stored in a cookie that is sent to or made available to the portal, or a cookie containing bit flags in which the user can set and unset options such as snapshot reporting.

It is a further aspect of the invention to employ a system comprising a plurality of optimized "snapshot servers". The snapshot servers access and deliver graphic snapshots from storage, to the network address of a user to whom a search is being reported. The snapshot servers can conduct packet data transmission, serve requests for re-send, etc. The snapshot servers remove the overhead of reporting graphic files from the searching processes, and thus ensure that search reports are as quick as possible. The search process passes the graphic file names and user network address to the snapshot servers. The snapshot servers transmit the graphic snapshot files corresponding to each search report following shortly after the search report text.

In a preferred embodiment, the snapshot servers employ a RAM cache for storage of some or all of the snapshot images to be reported to users. This contributes further to the reporting speed because it is not necessary to await the addressing and loading of image snapshot files from the system hard disk and the hard disk does not become an undue bottleneck. Upon system startup the library of quick access snapshot graphics can be copied from a hard drive into the RAM cache. The cached files can be all of the snapshot graphic files or only those found after experience to be most frequently addressed. The snapshot servers preferably share or employ a large cache, for example at least 1 Gigabyte and preferably 10 Gigs or greater.

For determining the frequency of addressing, the snapshot servers preferably contain a program or process that counts or calculates the two million most requested snapshots. This can be updated on a weekly basis. Although any number of snapshots could be maintained within rapid access of the search engine's database, a predetermined number of those found to be most requested, such as two million, are kept directly in the memory cache (hence a cache size of 10 Gigs, or approximately 5 KBytes per image). The status of a given page as being among the predetermined number (e.g., two million) that are most often requested or at least most often reported in searches, can be indicated in the graphic results, for example by adding a frame to the snapshot that is reported by transmitting an additional frame graphic.

In a preferred embodiment, the textual portion of search results always is sent and caused to appear first, prior to the snapshots corresponding to those results. As a result, regardless of whether the user has turned the snapshots capability "ON" or "OFF", the text portion appears first. If a user so desires, he can abort the transmission of the results based on review of the initially received portion. This is accomplished through programming within the snapshot server system that queues the text portion of the search results to be "released" or transmitted first, preferably even before addressing (or perhaps even checking for the presence on the corresponding snapshots.

A number of additional variations and further embodiments are possible and will become apparent to persons skilled in the art in view of this disclosure. The invention is not intended as limited to the precise arrangements disclosed as examples. Accordlingly, reference should be made to the appended claims for assessing the scope of exclusive rights claimed.

I claim:

[1. A method for processing data files stored at distributed addresses on a data processing network, at least some of the data files having text and graphic content, the method comprising:

analyzing at least a subset of the data files to produce a database of information characterizing aspects of the data files that tend to distinguish the data files from one another, and cross referencing said information to addresses of the data files;

generating an image of at least a portion of the subset of data files, and storing a graphic file of said image in a manner cross referenced to the addresses of the data files, whereby the graphic file represents an image of the data files at a time of generation;

receiving search queries and applying the search queries to the database for selecting a hit list from among the data files;

reporting the hit list in a search report including the addresses of each of the data files selected and the image corresponding to the data files in the hit list at the respective time of generation.]

[2. The method of claim 1, wherein the data files comprise hypertext markup language text and linked graphic format files, and wherein said analyzing comprises at least one of indexing the text and reviewing at least a portion of the data files for assignment of an arbitrary categorization.]

[3. The method of claim 2, wherein the data files comprise hypertext markup language text and linked graphic format files on one of an intranet and the World Wide Web, and wherein said generating comprises rendering an image corresponding to the data files according to a predetermined display configuration defining a default choice of at least one of a pixel display size, font type, color pallet, color resolution and use of colors.]

[4. The method of claim 2, wherein said analyzing and said generating are accomplished using at least two processes, one of said processes collecting the hypertext markup language text and the linked graphic format files and another of said processes rendering the graphic files as a presentation of respective said data files.]

[5. The method of claim 4, comprising a greater number of said processes collecting the files than a number of said processes rendering the presentation.]

[6. The method of claim 4, comprising storing in a buffer each of the files collected by said processes collecting the files, queuing the process for generating the image, and deleting the files in the buffer after generating the image.]

[7. The method of claim 4, comprising operating said process rendering the presentation file using at least part of a computer's display facility to produce a bitmap, and converting the bitmap into a graphic format file.]

[8. The method of claim 4, comprising operating said process rendering the presentation file by reducing a display size of the bitmap and converting the bitmap into a graphic format file.]

[9. The method of claim 2, wherein said reporting of the hit list comprises composing a hypertext report page containing selectable links for addressing corresponding said data files, and transmitting the hypertext report page to a user submitting a query, and wherein the report page additionally includes an image link addressing the graphic file for at least a portion of the hits.]

[10. The method of claim 1, further comprising stripping at least one variable aspect of the data files, said aspect comprising at least one of a time changing display feature, a user interactive feature and a nonvisual media feature.]

[11. A network search engine for managing user selection of information contained on data files stored at distributed network addresses on a global information processing network wherein distributed users have control over associated data files accessible by other users, each of said data files having at least some associated text and each of the data files having at least one mode of graphic presentation, comprising:

a crawler having at least one processor operable to address and load successive data files comprising at least a subset of said data files stored at said distributed network addresses, the crawler being operable to produce and store a database of information characterizing aspects of the data files that tend to distinguish the data files from one another, cross referenced to addresses of the data files; and, wherein the crawler is further operable to produce graphic image files representing at least some of the data files, the graphic image files each corresponding to content of corresponding said data files at a point in time, and wherein the crawler is operable to store the graphic image file so as to cross reference the graphic image file to the data files in the database.]

[12. The network search engine of claim 11, further comprising programmed processes operable to receive search queries from network users, to apply the search queries to the database for selecting a hit list from among the data files and to report the hit list in a search report including the addresses of each of the data files selected and the image corresponding to the data files in the hit list at the respective time of generation.]

[13. The network search engine of claim 11, wherein the data files comprise hypertext markup language text and linked graphic format files, and wherein said analyzing comprises at least one of: indexing the text for storing a text index cross referenced to network addresses of the data files; and reviewing at least a portion of the data files for assignment of an arbitrary categorization and for storing a categorization cross referenced to the network addresses of the data files.]

[14. The network search engine of claim 11, wherein the crawler operates at least two discrete processes for collecting the data files and files linked thereto, and for producing the graphic image files.]

[15. The network search engine of claim 14, wherein the discrete processes operate together on at least one processor, and wherein the processes for collecting are more numerous than at least one said process for producing the graphic image files.]

[16. The network search engine of claim 15, wherein the process for producing the graphic image file renders an image of the data files from downloaded copies of the hypertext markup language text and linked graphic format files, and converts a resulting display image file into the graphic format file.]

[17. The network search engine of claim 16, wherein the process for producing the graphic image file renders the image of the data files according to a configuration selected as a default configuration with respect to at least one of use of changing visual features, presentation of user interactive features, presentation of non-visual media, display pixel resolution, color pallette, color resolution, and use of colors.]

[18. The network search engine of claim 17, further comprising a programmed process for producing the graphic image file, which co-opts a display bitmap from a processor programmed to present the data files, and converts the bitmap to a compressed graphic format file stored on the search engine.]

[19. An improved Internet search engine for managing user search and selection of web pages stored at distributed systems coupled at network addresses to the Internet, the search engine having an associated web crawler operable to address and load successive web pages, and to index text data associated with said successive web pages so as to obtain parameter information that distinguishes at least groups of the web pages from one another, the crawler storing the parameter information and associated addresses of the web pages, and the search engine being operable responsive to user submitted search criteria to search the parameter information and to report at least the associated addresses of web pages that met the search criteria when indexed, wherein the improvement comprises:

said crawler being operable in conjunction with obtaining the parameter information for at least a subset of said successive web pages to generate a graphic image file containing a visual image that is substantially identical to an appearance of said web pages, for display in a size proportionally smaller than said web pages; and wherein the search engine is operable when reporting the associated addresses of web pages that met the search criteria to include a representation of the graphic image file in said proportionally smaller size.]

[20. The improved Internet search engine of claim 19, wherein the crawler generates the graphic image file with an appearance of the web pages according to a predetermined default display configuration of a browser.]

[21. The improved Internet search engine of claim 20 wherein the predetermined default display configuration defines a selection of at least one of relative font size and type, colors and pixel aspect ratio.]

[22. The improved Internet search engine of claim 21, wherein the search engine reports to the user the associated addresses of the web pages that met the search criteria, in a form of hypertext source data containing URL links to said web pages, and wherein the graphic image file is displayed in association with a URL link to the web page represented by the graphic image file.]

[23. The improved Internet search engine of claim 21, wherein the graphic image file comprises a compressed pixel image of a bitmap corresponding to said web pages.]

[24. The improved Internet search engine of claim 22, wherein the graphic image file is transmitted as an image link in the hypertext source data to a file compressed by at least one of MIME, Binhex and Base64.]

*25. A system comprising:*

*a fetching agent configured to receive a website file via at least one network interface, wherein the website file is associated with a web page;*

*a rendering agent configured to generate, based on the website file, a visual representation file that represents a rendered appearance of the web page that is substantially identical to an appearance of the web page and to compress the visual representation file of the web page into a reduced image file,*

*wherein the reduced image file represents a reduced-size rendered appearance of the web page for display in a size proportionally smaller than the web page, and*

*wherein the rendering agent is further configured to limit a dynamic aspect of dynamic content in the website file to a static display, wherein the static display comprises an image from the dynamic content in the web page at a fixed time;*

*a memory, configured to store the reduced image file and at least one network address associated with a network location of the website file, wherein the memory is further configured to cross reference the reduced image file with the at least one network address; and*

*a first plurality of fetching agents and a second plurality of rendering agents, and wherein a ratio of the first plurality of fetching agents to the second plurality of rendering agents is modified during processing of website files to maintain a consumption of the memory within a range of fractions of a capacity of the memory.*

*26. The system of claim 25, wherein the fetching agent is further configured to utilize a plurality of concurrently active requests for web pages.*

*27. The system of claim 25, wherein the fetching agent is further configured to remove dynamic content from the website file.*

*28. The system of claim 25, wherein the web page includes nontext data.*

*29. The system of claim 25, further comprising:*

*a search portal configured to:*

*receive search criteria; and*

*generate a report based on the search criteria, the report comprising the at least one network address and one of:*

*a link to the reduced image file, and*

*a copy of the reduced image file.*

*30. The system of claim 25, wherein the at least one network address comprises a uniform resource locator (URL) address of the web page.*

*31. The system of claim 25, wherein the static display comprises a frame of the dynamic content at the fixed time.*

*32. The system of claim 25, wherein the rendering agent is further configured to include an icon in the reduced image file indicating that the web page includes dynamic content.*

*33. The system of claim 32, wherein the icon indicates a type of the dynamic content.*

*34. A method comprising:*

*receiving, at a computer, a website file via at least one network interface, wherein the website file is associated with a web page;*

*generating, at the computer, a visual representation file that represents a rendered appearance of the web page that is based on the website file, wherein the generating limits a dynamic aspect of dynamic content in the website file to a static display, wherein the static display comprises an image from the dynamic content in the web page at a fixed time;*

*compressing, at the computer, the visual representation file of the web page into a reduced image file, wherein the reduced image file represents a reduced-size rendered appearance of the web page;*

*storing, at the computer, the reduced image file and at least one network address associated with a network location of the website file, wherein storing the reduced image file and the at least one network address comprises cross referencing the reduced image file with the at least one network address; and*

*modifying a ratio of first plurality of fetching agents to second plurality of rendering agents during processing of website files to maintain a consumption of memory within a range of fractions of a capacity of the memory.*

*35. The method of claim 34, wherein the web page includes nontext data.*

*36. The method of claim 34, further comprising:*

*receiving search criteria; and*

*generating a report based on the search criteria, the report comprising the at least one network address and one of:*

*a link to the reduced image file, and*

*a copy of the reduced image file.*

*37. A non-transitory computer-readable storage medium having instructions stored thereon, the instructions comprising:*

*instructions for receiving a website file via at least one network interface, wherein the website file is associated with a web page,*

*instructions for generating, based on the website file, a visual representation file that represents a rendered appearance of the web page, wherein the generating limits a dynamic aspect of dynamic content in the website file to a static display, and wherein the static display comprises an image from the dynamic content in the web page at a fixed time;*

*instructions for compressing the visual representation file of the web page into a reduced image file, wherein the reduced image file represents a reduced-size rendered appearance of the web page;*

*instructions for storing the reduced image file and at least one network address associated with a network location of the website file, wherein the instructions for storing the reduced image file comprise instructions for cross referencing the reduced image file with the at least one network address; and*

*instructions for modifying a ratio of first plurality of fetching agents to second plurality of rendering agents during processing of website files to maintain a consumption of memory within a range of fractions of a capacity of the memory.*

*38. The non-transitory computer-readable storage medium of claim 37, wherein the instructions for receiving, the instructions for generating, the instructions for compressing, and the instructions for storing are configured to operate on a single processor.*

*39. The non-transitory computer-readable storage medium of claim 37, wherein the instructions for receiving, the instructions for generating, the instructions for compressing, and the instructions for storing are configured to operate on multiple processors.*

*40. The non-transitory computer-readable storage medium of claim 39, wherein at least one of the multiple processors exclusively executes the instructions for receiving.*

*41. The non-transitory computer-readable storage medium of claim 37, wherein the web page includes nontext data.*

*42. The non-transitory computer-readable storage medium of claim 37, further comprising:*

*instructions for receiving search criteria; and*

*instructions for generating a report based on the search criteria, the report comprising the at least one network address and one of:*

*a link to the reduced image file, and*

*a copy of the reduced image file.*

*43. A non-transitory computer-readable storage medium having instructions stored thereon, the instructions comprising:*

*instructions for receiving a file via at least one network interface, wherein the file includes formatting information;*

*instructions for generating, based on the formatting information, a visual representation file that represents a rendered appearance of the file, wherein the generating limits a dynamic aspect of dynamic content in the file to a static display, wherein the static display comprises an image from the dynamic content in a web page at a fixed time;*

*instructions for compressing the visual representation file into a reduced image file, wherein the reduced image file represents a reduced-size rendered appearance of the file;*

*instructions for storing the reduced image file and at least one network address associated with a network location of the file, wherein the instructions for storing the reduced image file comprise instructions for cross referencing the reduced image file with the at least one network address; and*

*instructions for modifying a ratio of first plurality of fetching agents to second plurality of rendering agents during processing of website files to maintain a consumption of memory within a range of fractions of a capacity of the memory.*

*44. The non-transitory computer-readable storage medium of claim 43, further comprising:*

*instructions for receiving search criteria; and*

*instructions for generating a report based on the search criteria, the report comprising the at least one network address and one of:*

*a link to the reduced image file, and*

*a copy of the reduced image file.*

* * * * *